(12) United States Patent
Kilmer et al.

(10) Patent No.: US 11,734,641 B2
(45) Date of Patent: *Aug. 22, 2023

(54) DATA COLLECTION SYSTEM AND INTERFACE

(71) Applicant: CargoSense, Inc., Reston, VA (US)

(72) Inventors: Richard Allen Christopher Kilmer, Clifton, VA (US); Benjamin Aaron Wilson, Falls Church, VA (US)

(73) Assignee: CargoSense, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,833

(22) Filed: Jul. 11, 2022

(65) Prior Publication Data

US 2022/0343274 A1    Oct. 27, 2022

Related U.S. Application Data

(63) Continuation of application No. 16/712,642, filed on Dec. 12, 2019, now Pat. No. 11,386,387.

(60) Provisional application No. 62/779,248, filed on Dec. 13, 2018.

(51) Int. Cl.

| | |
|---|---|
| *G06F 16/955* | (2019.01) |
| *G06Q 10/0833* | (2023.01) |
| *G06K 19/06* | (2006.01) |
| *G06Q 10/087* | (2023.01) |
| *G06F 3/04812* | (2022.01) |

(52) U.S. Cl.
CPC ..... *G06Q 10/0833* (2013.01); *G06F 3/04812* (2013.01); *G06F 16/9554* (2019.01); *G06K 19/06028* (2013.01); *G06Q 10/087* (2013.01)

(58) Field of Classification Search
CPC .............. G06Q 10/0833; G06Q 10/087; G06F 16/9554
USPC ............................................ 235/462.13, 385
See application file for complete search history.

(56) References Cited

U.S. PATENT DOCUMENTS

| | | | |
|---|---|---|---|
| 5,804,803 A | 9/1998 | Cragun et al. | |
| 5,869,819 A | 2/1999 | Knowles et al. | |
| 6,012,102 A | 1/2000 | Shachar | |
| 7,080,034 B1 * | 7/2006 | Reams | G06Q 40/00 |
| | | | 705/37 |
| 8,542,099 B2 * | 9/2013 | Pizzuto | H04Q 9/00 |
| | | | 235/462.07 |
| 2009/0267740 A1 * | 10/2009 | Pizzuto | H04Q 9/00 |
| | | | 340/10.1 |

(Continued)

*Primary Examiner* — Paultep Savusdiphol
(74) *Attorney, Agent, or Firm* — Morrison & Foerster LLP

(57) ABSTRACT

Systems for data measurement and collection are provided. A data collection system may comprise a database configured to store data about objects to be tracked, and optical codes corresponding to specific database entries may be generated, printed, and provided in physical proximity to the object to be tracked. When a user scans the optical code with a mobile electronic device, the mobile electronic device may automatically upload geographic information to the database and may prompt the user to enter measurement information to additionally be uploaded to the database. Sets of optical codes may be configured to collect user-specified types of data, and the optical codes may be provided in printable sheets; virtual visual representations of the sheets may be displayed on an electronic interface, and the virtual visual representations may indicate which of the codes have or have not been registered with the system.

23 Claims, 14 Drawing Sheets

(56) References Cited

U.S. PATENT DOCUMENTS

| | | |
|---|---|---|
| 2012/0085829 A1 | 4/2012 | Ziegler |
| 2014/0252085 A1* | 9/2014 | Kim ..................... G01D 21/00 235/375 |
| 2015/0102100 A1* | 4/2015 | Hattrup ................. G06Q 30/02 53/64 |
| 2015/0178673 A1* | 6/2015 | Penneman .............. B61K 1/00 104/18 |
| 2016/0381200 A1* | 12/2016 | McCleland .......... G06V 30/373 455/422.1 |
| 2017/0083857 A1* | 3/2017 | Barton ............... G06Q 10/0833 |

* cited by examiner

← QRSensor Details

Properties

| | | |
|---|---|---|
| 414a | Account | PharmaCo, Inc |
| 414b | Name | 678345 |
| 414c | UUID | e0e4cb07-58eb-42ac-b922-53bf3fccba7d |
| 414d | Model | GPS and Temperature QRSensor |
| 414e | Profile | Logistics Tracking |
| 414f | Registered at | 2018-10-29 03:14:31 UTC |

REVEAL QRSENSOR

FIG. 4C

DATA COLLECTION SYSTEM AND INTERFACE

CROSS-REFERENCE TO RELATED APPLICATIONS

This application is a continuation of U.S. application Ser. No. 16/712,642, filed Dec. 12, 2019, which claims the benefit of U.S. Provisional Application No. 62/779,248, filed Dec. 13, 2018, the entire contents of each of which are incorporated herein by reference.

FIELD

This disclosure relates generally to data collection systems, and particularly to data collection systems for tracking and measuring physical objects using optical codes to associate physical objects with measured and recorded characteristics thereof.

BACKGROUND

The proliferation of the Internet of things (IoT) has dramatically increased the number of devices capable of collecting and transmitting data. However, IoT devices are typically designed to collect only specific kinds of data and are designed for specific applications, leading to high development costs and long deployment times. Thus, there exists a need for a low-cost, customizable data collection system that can collect and store different types of data for different applications.

BRIEF SUMMARY

As discussed above, there is a need for low-cost, customizable data collection systems. This need may be addressed by the systems, methods, and techniques disclosed herein for configuring, deploying, and using a data collection system for tracking and measuring characteristics of physical objects. The system allows users to define data profiles that correspond to measurable characteristics of particular objects, and to associate the data profiles with unique optical codes that may be deployed and physically associated with the physical object to be measured. Users may then scan the physically deployed instance of the optical code with a mobile device (e.g., a smart phone) to cause the device to automatically prompt the user to enter certain measured data, to automatically measure certain data, and/or to automatically transmit information regarding the measured data for storage.

Embodiments contemplated in the present disclosure may address the needs discussed above by decoupling the measurement component of a network connected device from the identity of the object to be measured and/or from an electronic device for determining the identity of the object to be measured. Disclosed are devices, systems, and methods for configuring and deploying a customizable data collection system.

To configure the system, a user may generate and store digital entries that uniquely correspond to optical codes. The optical codes may be associated with real world objects via a physical deployment of instances of the optical codes, such as one or more printed labels or stickers.

A user may then scan the optical code associated with an object, such as by using a mobile electronic device, to access one or more graphical user interfaces for inputting measurements of the object. The device may then transmit the inputted data associated with the object, in addition to any other automatically measured data regarding the object and/or the time or nature of the measurement. The transmitted data may be based on any appropriate physical sensor or measurement device, including sensors integrated into the device that scanned the optical code and/or sensors separate from the device that scanned the optical code, or based on observations by the user. A physical sensor that is the source of the measurement does not need to be associated with the object or known to the data collection system.

In this way, physical embodiments of the optical codes, such as printed labels generated by the system, may serve as virtual sensors that identify the measured object but are not constrained to the measurement capability of a particular physical sensor to characterize the object. Therefore, the disclosed data collection system may be customized by the user to collect any type of data in any type of application.

In some embodiments, a first method, for measuring and recording a characteristic of an object, is provided, the first method comprising: at a device comprising a display, an optical sensor, a GPS sensor, one or more processors, and memory: detecting, by the optical sensor, an optical code, wherein the optical code is physically associated with an object; and in response to detecting the optical code: decoding an identifying value encoded in the optical code; transmitting geographic information from the GPS sensor to a remote server, wherein the geographic information is transmitted in accordance with the decoded identifying value; and transmitting information regarding one or more measured characteristics of the object, the information regarding the one or more measured characteristics being distinct from the geographic information, to the remote server, wherein the information regarding one or more measured characteristics is transmitted in accordance with the decoded identifying value.

In some embodiments, the first method comprises: in response to detecting the optical code, displaying a prompt for a user to enter information regarding the one or more measured characteristics of the object.

In some embodiments, the first method comprises: in response to detecting the optical code, automatically reading information regarding the one or more measured characteristics of the object from a sensor associated with the device.

In some embodiments of the first method, the sensor is integrated into the device.

In some embodiments of the first method: the sensor is communicatively coupled with the device via one or more network communication interfaces, and automatically reading information regarding the one or more measured characteristics of the object from the sensor comprises causing the device to receive, via the one or more network transmissions from the sensor, a network communication transmission comprising information regarding the one or more measured characteristics.

In some embodiments of the first method, the identifying value uniquely corresponds to an entry in a database.

In some embodiments, the first method comprises: in response to detecting the optical code, in accordance with a determination that registration transmission has not previously been transmitted to the remote server in response to detection of the optical code, displaying a registration interface comprising a user interface object configured to accept a user input comprising information associated with registering the optical code; detecting an instruction from the user to transmit the information associated with registering the optical code; and in response to receiving the instruction to transmit the information associated with registering the optical code, transmitting an instruction to the remote server to register the optical code by uniquely associating the entry in the database with the information associated with registering the optical code.

In some embodiments of the first method, the information associated with registering the optical code comprises a name associated with the object.

In some embodiments of the first method, the identifying value comprises a URL corresponding to the entry in the database.

In some embodiments of the first method, the optical code comprises a QR code.

In some embodiments, a device for measuring and recording a characteristic of an object is provided, the device comprising a display, an optical sensor, a GPS sensor, one or more processors, and memory storing instructions executable by the one or more processors to cause the device to: detect, by the optical sensor, an optical code, wherein the optical code is physically associated with an object; and in response to detecting the optical code: decode an identifying value encoded in the optical code; transmit geographic information from the GPS sensor to a remote server, wherein the geographic information is transmitted in accordance with the decoded identifying value; and transmit information regarding one or more measured characteristics of the object, the information regarding the one or more measured characteristics being distinct from the geographic information, to the remote server, wherein the information regarding one or more measured characteristics is transmitted in accordance with the decoded identifying value.

In some embodiments a first non-transitory computer-readable storage medium, storing instructions for measuring and recording a characteristic of an object, is provided, the instructions configured to be executed by one or more processors of a device comprising a display, an optical sensor, a GPS sensor, and one or more processors, the instructions configured to cause the device to: detect, by the optical sensor, an optical code, wherein the optical code is physically associated with an object; and in response to detecting the optical code: decode an identifying value encoded in the optical code; transmit geographic information from the GPS sensor to a remote server, wherein the geographic information is transmitted in accordance with the decoded identifying value; and transmit information regarding one or more measured characteristics of the object, the information regarding the one or more measured characteristics being distinct from the geographic information, to the remote server, wherein the information regarding one or more measured characteristics is transmitted in accordance with the decoded identifying value.

In some embodiments, a second method, for configuring a data collection system, is provided, the second method comprising: at a system comprising a display, one or more processors, and memory: detecting a first user input, wherein the first user input comprises an instruction to generate a set of database entries for monitoring respective objects, and wherein the first user input indicates one or more characteristics of the objects to be monitored; in response to detecting the first user input: creating a set of database entries, wherein each entry of the set of database entries is configured to store data regarding the one or more characteristics of one of the respective objects; and generating a set of optical codes, wherein each code of the set of optical codes uniquely corresponds to one of the database entries created; detecting a second user input, wherein the second user input comprises an instruction to display a plurality of images associated respectively with a subset of the set of database entries, wherein each image of the plurality of images uniquely corresponds to a respective one of the set of database entries; and in response to detecting the second user input, displaying a dynamic visual representation of the plurality of images, wherein, for each of the plurality of images, the image visually indicates whether the system has received registration information regarding association of a physical instance of the corresponding optical code with one of the objects.

In some embodiments of the second method, the first user input comprises a selection by the user of a data profile, wherein the data profile indicates the one or more characteristics of the objects to be monitored.

In some embodiments of the second method, the dynamic digital representation of the one or more of the optical codes comprises a visual representation of a sheet of labels, wherein each of the labels comprises one of the optical codes.

In some embodiments of the second method: the dynamic visual representation indicates that the system has received registration information for a first one of the images by not displaying a first corresponding optical code as a part of the first image; and the dynamic visual representation indicates that the system has not received registration information for a second one of the images by displaying a second corresponding optical code as a part of the second image.

In some embodiments, the second method comprises: receiving a third user input indicating an instruction to display information regarding a plurality of measurements associated with one of the database entries of the set of database entries; and in response to receiving the third user input, displaying a chronological list of measurement transmissions, wherein each of the measurement transmissions comprises a time of the measurement and a data regarding the one or more characteristics.

In some embodiments of the second method, one or more of the measurement transmissions comprises a photograph transmitted from a portable electronic device.

In some embodiments, a data-collection system is provided, the system comprising a display, one or more processors, and memory storing instructions executable by the one or more processors to cause the system to: detect a first user input, wherein the first user input comprises an instruction to generate a set of database entries for monitoring respective objects, and wherein the first user input indicates one or more characteristics of the objects to be monitored; in response to detecting the first user input: create a set of database entries, wherein each entry of the set of database entries is configured to store data regarding the one or more characteristics of one of the respective objects; and generate a set of optical codes, wherein each code of the set of optical codes uniquely corresponds to one of the database entries created; detect a second user input, wherein the second user input comprises an instruction to display a plurality of images associated respectively with a subset of the set of database entries, wherein each image of the plurality of images uniquely corresponds to a respective one of the set of database entries; and in response to detecting the second user input, display a dynamic visual representation of the plurality of images, wherein, for each of the plurality of images, the image visually indicates whether the system has received registration information regarding association of a physical instance of the corresponding optical code with one of the objects.

In some embodiments, a second non-transitory computer-readable storage medium, storing instructions for configuring a data collection system, is provided, the instructions configured to be executed by one or more processors of a system comprising a display and one or more processors, the instructions configured to cause the system to: detect a first user input, wherein the first user input comprises an instruction to generate a set of database entries for monitoring respective objects, and wherein the first user input indicates one or more characteristics of the objects to be monitored; in response to detecting the first user input: create a set of database entries, wherein each entry of the set of database entries is configured to store data regarding the one or more characteristics of one of the respective objects; and generate a set of optical codes, wherein each code of the set of optical codes uniquely corresponds to one of the database entries created; detect a second user input, wherein the second user input comprises an instruction to display a plurality of images associated respectively with a subset of the set of database entries, wherein each image of the plurality of images uniquely corresponds to a respective one of the set of database entries; and in response to detecting the second user input, display a dynamic visual representation of the plurality of images, wherein, for each of the plurality of images, the image visually indicates whether the system has received registration information regarding association of a physical instance of the corresponding optical code with one of the objects.

In some embodiments, a data measurement and collection system is provided, the system comprising: a server configured to: detect a first user input, wherein the first user input comprises an instruction to generate a set of database entries for monitoring respective objects, and wherein the first user input indicates one or more characteristics of the objects to be monitored; and in response to detecting the first user input: create a set of database entries, wherein each entry of the set of database entries is configured to store data regarding the one or more characteristics of one of the respective objects; and generate a set of optical codes, wherein each code of the set of optical codes uniquely corresponds to one of the database entries created; and a mobile electronic device comprising an optical sensor and a GPS sensor, the mobile electronic device configured to: detect, by the optical sensor, one of the optical codes of the set of optical codes, wherein the optical code is physically associated with one of the objects; and in response to detecting the optical code: transmit geographic information from the GPS sensor to the server; and transmit information regarding a measurement of the one or more characteristics of the object, the information regarding a measurement being distinct from the geographic information, to the server.

In some embodiments of the data measurement and collection system, the mobile electronic device is configured to, in response to detecting the optical code, display a graphical user interface configured to accept a user input indicating the measurement of the one or more characteristics of the object.

In some embodiments, any one or more features of any of the methods, systems, devices, and computer-readable mediums disclosed above or elsewhere herein may be combined with one another and/or with features of any one or more of the other methods, systems, devices, and computer-readable mediums disclosed elsewhere herein.

BRIEF DESCRIPTION OF THE DRAWINGS

FIG. 4C is an exemplary depiction of an interface for viewing the properties of a digital label entry, according to some embodiments.

DETAILED DESCRIPTION

Described herein are exemplary embodiments of systems, devices, and methods for configuring and deploying a customizable data collection system. The system provides for the creation of customizable data profiles that correspond to real-world objects having unique measurable characteristics. The system provides for the creation of unique optical codes that may be deployed and physically associated with objects to be measured. In this way, the optical codes may uniquely identify each measured object in the system. The system allows for the collection of data corresponding to any measurable or observable characteristic of an object by receiving data transmitted by a mobile device that has detected the optical code associated with the object.

Figure 1:
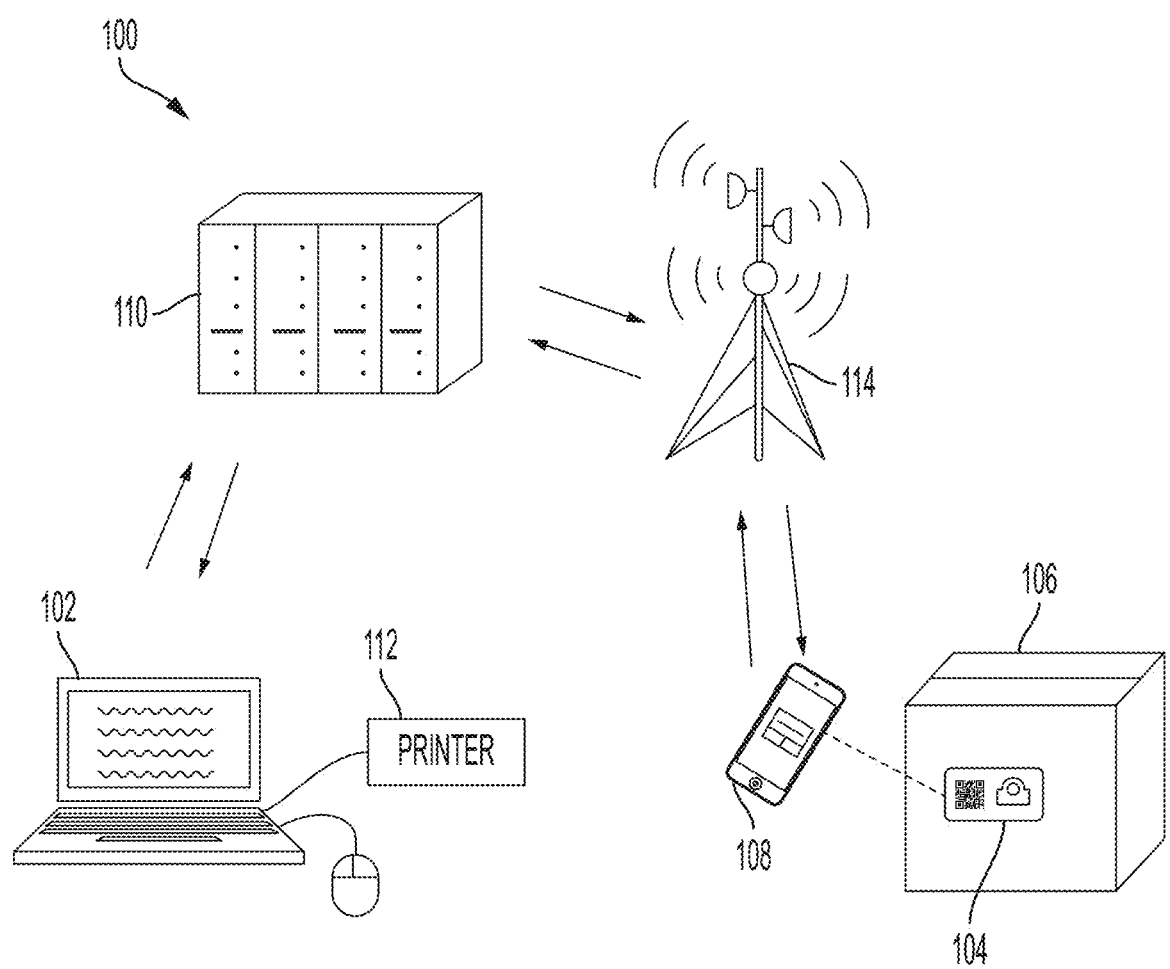
FIG. 1 is a diagram of the data collection system, according to some embodiments.

FIG. 1 illustrates a system 100 for configuring and deploying a customizable data collection system for tracking and/or measuring characteristics of real-word objects, according to some embodiments. In some embodiments, the system comprises a web service and a mobile application. System 100 includes a terminal 102 for configuring and managing the system, a physical label 104 for identifying an object 106, a mobile device 108 for measuring, entering, and/or transmitting data regarding object 106, a server 110 to host the system and to store data collected by the system, a printer 112 for generating physical labels, and a networking device 114 to enable communication between terminal 102, mobile device 108, and server 110.

System 100 may generate and store digital label entries in the system and generate optical codes that are uniquely associated with the label entries. A digital label entry is a data object that represents a physical object 106 in the system. The digital label entries may be stored in server 110 and/or in any suitable storage system associated with server 110. In some embodiments, a digital label entry may be stored as an entry in a database. Each digital label entry may be identified in system 100 by a universally unique identifier (UUID).

System 100 may generate physical labels 104 based on the optical codes. In some embodiments, the optical code may be printed on a physical label 104 by printer 112. A physical label 104 may be deployed by physically associating the label 104 with an object 106 to be measured. In this way, the optical code associated with a physical label 104 may uniquely identify an object 106 in within system 100. When a user scans an optical code with mobile device 108, the device may transmit data to server 110 or may prompt the user to enter data regarding the corresponding object 106 to be transmitted to server 110. Server 110 may receive and store data transmitted by mobile device 108 and associate the data with the object's corresponding digital label entry within system 100.

System 100 may be used to collect data regarding any measurable or observable characteristic of an object. For example, system 100 may collect data regarding temperature of an object, ambient temperature around an object, pressure inside a tank or line, fluid level inside a tank, humidity, ambient light, weight, speed, location, altitude, mass, density, voltage, current, power, or any other measurable quantity. Alternatively, system 100 may collect data regarding whether a machine is on or off, whether a package is damaged or undamaged, whether a package is delivered or undelivered, how many units a machine has manufactured, whether a valve is open or closed, whether a door is open or closed, or any other observable status of an object.

Terminal 102 may be a host computer connected to a network, a client computer, or a server. Terminal 102 can also be any suitable type of microprocessor-based device, such as a personal computer, workstation, server, videogame console, or handheld computing device, such as a phone or tablet.

Mobile device 108 may be a computer, a smartphone, a tablet, a barcode scanner, a QR scanner, or other type of microprocessor-based device with a suitable optical sensor. In some embodiments, the optical sensor may be a camera.

Server 110 may be a database server, a web server, an application server, or any type of microprocessor-based device suitable for transmitting, receiving, and storing data. Server 110 may comprise multiple servers that may be co-located or located at different locations. Server 110 may comprise cloud computing and storage solutions.

Networking device 114 may be a server, a cellular communications network, or other suitable type of interconnected communications system that allows communication between terminal 102, mobile device 108, and server 110. Networking device 114 can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Figure 2:
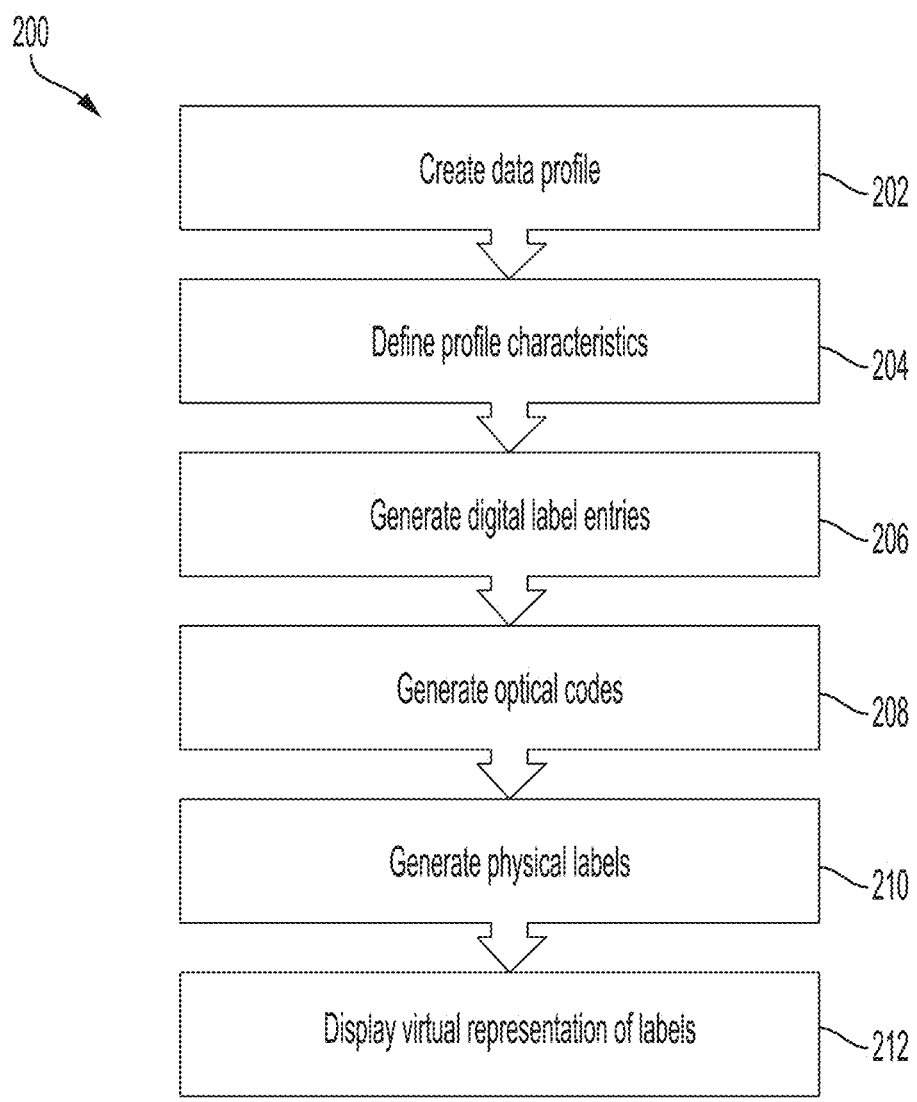
FIG. 2 is a flow diagram that illustrates the process for configuring the data collection system and deploying the tracking codes, according to some embodiments.

FIG. 2 illustrates a method 200 for configuring and deploying the data collection system. In some embodiments, method 200 may be performed at a system such as system 100 discussed above with reference to FIG. 1. In some embodiments, method 200 may enable a user of systems described herein to configure and deploy one or more aspects of a data collection system, including configuring the system to collect certain types of data, generating physical labels that correspond to entries within the system, and associating the labels with real-world objects to identify the objects within the system.

At step 202, a data profile is created that corresponds to a class of objects to be measured or tracked. The data profile is a data object that defines the types of data that digital label entries in the system may accept. For example, a logistics tracking data profile may be defined to accept location data. A digital label entry based on such a data profile may only accept data based on location. The data profile may be stored in server 110 and/or in any suitable storage system associated with server 110. In other embodiments, system 100 may prompt a user to create a data profile by displaying a prompt at terminal 102, or a user may initiate the creation of a data profile at terminal 102.

At step 204, the characteristics of the data profile are defined. The characteristics of the data profile correspond to particular characteristics of a class of objects that the system may be used to measure and record.

In some embodiments, the characteristics of the data profile may be defined by a user at terminal 102. System 100 may display an interface at terminal 102 for defining the characteristics of a data profile. Using the interface, the user may enter characteristics to define the data profile. In response to detecting the user input, terminal 102 may transmit the user-entered characteristics to server 110. The transmitted data profile characteristics may be stored in server 110, and server 110 may associate the characteristics with the data profile object created at step 202.

The characteristics may correspond to any measurable or observable feature of an object. For example, a characteristic may correspond to a measurable feature of an object, such as temperature or geographical location. Alternatively, a characteristic may correspond to an observable state of an object, such as whether it is damaged or undamaged. The data profile may be configured to accept photographs. The data profile may also be configured to accept timestamp information corresponding to the time when a corresponding optical code is scanned or when data is received.

In addition to measurable characteristics, the data profile characteristics may also be defined in terms of events associated with the data profile. For example, a logistics tracking profile may be defined to have "Shipped" or "Delivered" events. If a data profile is defined by events, mobile device 108 may prompt a user to choose which event has occurred when the user scans an optical code associated with that data profile. If a data profile is defined by events, the interface of mobile device 108 may be dynamically populated based on those events when a user scans an optical code associated with the data profile. Rather than prompting a user to enter a measurement, mobile device 108 may prompt the user to choose which event has occurred from a predefined list of events that is dynamically populated based on the characteristics of the data profile.

Events may be designated as "final." After a final event has been received by the system, the corresponding digital label entry in the system will no longer accept data and the corresponding optical code will no longer be active.

The characteristics of a data profile may be defined based on individual measurements or events (e.g. temperature and/or location), selected one-at-a-time by a user. For example, a data profile may be defined to have a temperature characteristic, a location characteristic, or both. Alternatively, a data profile may be defined based one or more pre-defined "data models," or groups of measurements or events that are selected, by a user, as a group. A data model is a predefined scheme, which may be stored as a data object, that comprises combinations of possible data profile characteristics. Data models may be stored in server 110 and/or in any suitable storage system associated with server 110. A data model may be generated automatically by the system or may be manually defined by a user.

A data profile defined based on a data model may be defined to have all of the characteristics associated with the data model. For example, a "Temperature" data model may comprise a temperature characteristic and a location characteristic. If a data profile is defined based on the "Temperature" data model, the data profile will accept temperature and location data. Thus, data models may be created and used to define data profiles more quickly.

Characteristics of a data profile may be mandatory or optional. If a characteristic is mandatory, data regarding that characteristic must be transmitted each time a user scans an optical code associated with that data profile. For example, when a user scans a label associated with a logistics tracking profile, the profile may require location data to be transmitted. Alternatively, characteristics of a data profile may be optional. For example, a logistics tracking profile may permit, but not require, a photograph to be transmitted each time a label associated with that data profile is scanned.

At step 206, digital label entries are created. Digital label entries are data objects that represent physical objects in the system. Each digital label entry may be associated with a data profile and stored in server 110 and/or in any suitable storage system associated with server 110. A digital label entry may be an entry in a database.

A digital label entry may be generated and stored automatically by server 110. Alternatively, a digital label entry may be created in accordance with one or more instructions executed by a user at terminal 102. System 100 may display an interface for a user at terminal 102. Using the interface, the user may instruct the system to generate and store a certain number of digital label entries based on a particular data profile. In response to detecting the user input, terminal 108 may transmit the user input to server 110. Based on the transmitted data, server 110 may generate and store the number of digital label entries specified by the user and store the digital label entries in association with server 110. Server 110 may generate and store data associated with each digital label entry that identifies its data profile.

In some embodiments, a digital label entry may not correspond to a particular physical object when it is generated. A digital label entry may not correspond to a particular physical object until an optical code corresponding to the digital label entry has been associated with an object, such as upon registration of the optical code by an end user the first time the optical code is scanned by a mobile device (e.g., mobile device 108). Similarly, a digital label entry may not contain any measurement data when it is generated. A digital label entry may not contain any measurement data until a corresponding optical code has been scanned by a mobile device 108 and data corresponding to an object has been transmitted to the system and stored in association with the digital label entry.

The system may generate any number of digital label entries and associated physical labels corresponding to a particular data profile. Therefore, the system may collect data corresponding to any number of objects, up to and including thousands of objects, millions of objects, billions of objects, or more.

A digital label entry may be associated with further data objects that represent information corresponding to the digital label entry. For example, a digital label entry may be associated with further data objects that contain information that identifies the data profile associated with the digital label entry, identifies the optical code associated with the digital label entry, indicates whether the optical code associated with the digital label entry has ever been scanned, indicates the number of times the optical code associated with the digital label entry has been scanned, and/or other information corresponding to the digital label entry. Additionally, a digital label entry may be associated with further data objects that contain measurement data received by the system corresponding to the digital label entry.

At step 208, the system may generate and store unique optical codes corresponding to each digital label entry. Each optical code may encode information that uniquely identifies a digital label entry. The optical code may be a barcode, a QR code, or other optical code suitable for encoding data that uniquely identifies a digital label entry. In some embodiments, the optical code may encode a uniform resource identifier (URI), a uniform resource name (URN), and/or a uniform resource locator (URL).

The optical codes may be generated and stored by server 110. Each optical code may be stored in association with an entry in a database. Server 110 may generate an optical code automatically each time it generates and stores a digital label entry. Server 110 may generate and store additional data associated with the optical code that identifies the digital label entry to which the optical code corresponds. In some embodiments, the data may comprise a pointer.

At step 210, physical labels 104 are generated based on the optical codes. Physical labels 104 may be physical printed labels suitable for physical deployment into physical environments in which tracked/measured objects exist, and the physical labels may correspond to a plurality of respective digital label images that are printed onto the respective physical labels. Server 110 may generate and store digital label images corresponding to each digital label entry. Each digital label image may be stored in association with an entry in a database. Each digital label image may comprise an optical code that is readable by a mobile device 108. Each digital label image may contain information about the digital label entry to which the optical code corresponds. For example, the digital label entry may indicate the corresponding data profile, the UUID associated with the digital label entry, the name of the organization using the system, and/or other information.

Each digital label image may also contain iconography corresponding to characteristics of the associated digital label entry. In some embodiments, the digital label image may depict icons that correspond to the measurements accepted by the label's data profile. For example, a thermometer icon may be included in the digital label image to indicate that the label's corresponding data profile accepts temperature measurements. In other embodiments, the digital label image may also contain colors that correspond to the label's data profile, the type of measurements accepted by the label, or other information.

Server 110 may generate additional images for printing a plurality of physical labels. For example, server 110 may generate a printable form image, or "sheet," that comprises a plurality of digital label images arranged in a manner suitable for printing the digital label images on individual stickers. In some embodiments, a sheet may comprise a plurality of digital label images arranged into a grid or array suitable for printing the labels on commercially available adhesive label paper, such as Avery 5163 Shipping Labels.

In some embodiments, server 110 may modify one or more digital label images corresponding to each digital label entry. For example, in some embodiments, server 110 may modify a digital label image based on whether the corresponding optical code has ever been scanned. If the optical code has been scanned, server 110 may modify the corresponding digital label image by obscuring the optical code, removing the optical code, and/or modifying the optical code, such as by replacing the optical code with "In use" to prevent a user from re-printing and/or re-placing another label bearing the same image in association with another physical object. In some embodiments, digital label images displaying an "In Use" indicator may continue to be graphically displayed by the system as a part of the sheet on which they are located, thereby graphically representing the state of the physically-deployed printed labels, in which "In Use" labels may have been removed from the physical printed sheet and placed in association with a physical object, and in which labels that are not yet "In Use" may not yet have been removed from the physical printed sheet. Server 110 may dynamically generate the digital label images and printable form images each time physical labels 104 are displayed and/or printed based on the most recently received data.

Physical labels 104 may be printed by printer 112 based on digital label images and/or printable form images. Physical labels 104 may be deployed by being physically associated with physical objects 106 to identify the objects 106 in system 100, such as by being placed in physical proximity to the physical object. For example, labels or tracking package locations may be attached to the package itself. Alternatively or additionally, physical labels 104 may be deployed by being physically associated with a sensor from which data may be read. For example, labels for monitoring temperature of a room may be placed next to a thermometer, and labels for monitoring a fuel label may be placed next to a fuel gauge. In some embodiments, physical labels 104 may be adhesive stickers that can be attached to objects 106 to be measured and/or tracked and/or separate sensors.

At step 212, the system may display, at terminal 102, a virtual representation of one or more digital label entries associated with a particular data profile. In some embodiments, the system may display the virtual representation in response to an input from a user at terminal 102. In some embodiments, the virtual representation may comprise one or more digital label images associated with a data profile. In other embodiments, the virtual representation may comprise a particular arrangement (e.g., sheet) of digital label entries, such as the printable image form that comprises a plurality of digital label images in an arrangement suitable for printing.

In some embodiments, server 110 may dynamically generate the content of the virtual representation each time it is requested by a user and/or by a component of the system. For example, in some embodiments, server 110 may generate a virtual representation of the digital label entries based on the optical code associated with each digital label entry, the data profile associated with each digital label entry, the name of a digital label entry assigned by the user, and/or other information. The system may display, on terminal 102, the virtual representation generated by server 110. In other embodiments, server 110 may dynamically generate the virtual representation based on a determination whether the optical code associated with a digital label entry has previously been scanned and/or registered. For example, in accordance with a determination that the optical code associated with a digital label entry has previously been scanned and/or registered, server 110 may remove the optical code from the virtual representation. In other embodiments, server 110 may replace the optical code with "In use" to prevent the user from re-assigning the label to a second physical object.

Figure 3:
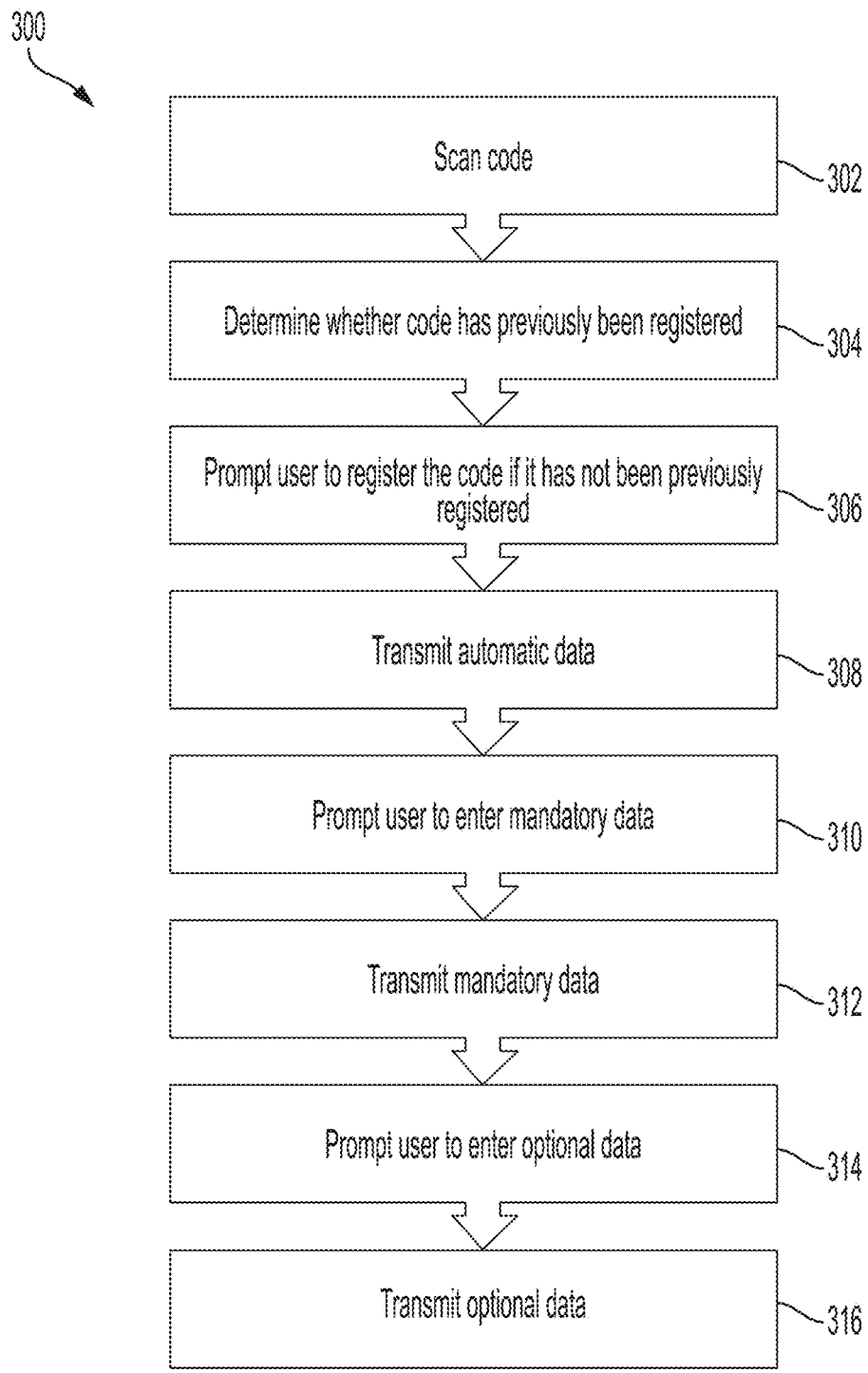
FIG. 3 is a flow diagram that illustrates the process of using a mobile device to collect and transmit information regarding a tracked object, according to some embodiments.

FIG. 3 illustrates a method 300 for using a mobile device 108 to collect data. In some embodiments, method 300 may be performed at a system such as system 100 discussed above with reference to FIG. 1. In some embodiments, method 300 may enable an end user using a portable electronic device such as a smart-phone to scan an optical code of system 100 in order to cause the portable electronic device to automatically upload certain information to a server of system 100 for storage in a database; in this way, the scanned optical code may function in conjunction with the portable electronic device as part of a virtual sensor for measuring and recording one or more characteristics of a tracked and/or monitored object associated with the optical code.

At step 302, mobile device 108 scans an optical code associated with an object 106. Mobile device 108 may be a smartphone, a tablet, a barcode scanner, a QR scanner, or other device with an optical sensor capable of scanning and decoding the optical code. In some embodiments, scanning the code may comprise detecting the code using a camera of mobile device 108. Mobile device 108 may decode the optical code to extract one or more pieces of identifying information (e.g., unique identifying information encoded in the optical code and not encoded in other optical codes in the system) and use the decoded information to communicate with server 110. In some embodiments, the decoded information may comprise a URI, URN, and/or URL that mobile device 108 may use to locate and access one or more local or remote network resources, such as by opening an internet-accessible webpage in a web browser to communicate with server 110. Mobile device 108 may communicate with server 110 by networking device 114.

The decoded information may cause mobile device 108 to transmit information to server 110 that allows server 110 to identify the digital label entry associated with the optical code. Based on the information transmitted by mobile device 108, server 110 may transmit information to mobile device 108, such as the identity of the digital label entry associated with the optical code, a name previously assigned to the digital label entry by a user, whether the optical code has previously been scanned, how many times the optical code has been scanned, the data profile of the digital label entry, past measurement data, the types of data accepted by the data profile, whether data is mandatory or optional, or other information. Server 110 may transmit instructions to mobile device 108, such as instructions from a website accessed by mobile device 108, to cause mobile device 108 to automatically execute one or more processes and/or display one or more interfaces to receive, record, and transmit measurement/tracking information from mobile device 108 to server 110. Server 110 may transmit information to mobile device 108 confirming receipt of the information transmitted by mobile device 108. Server 110 may also update a data object associated with the digital label entry corresponding to the optical code to indicate the total number of times the optical code has been scanned.

At step 304, system 100 determines whether the optical code has previously been "registered."

When an optical code is detected by a mobile device 108, the system may prompt the user to "register" the code. To register the optical code, mobile device 108 may display an interface prompting the user to enter a name to be associated with the optical code. The name may correspond to the physical object associated with the code, a physical sensor (e.g., a physical measuring device such as a thermometer, a speedometer, a fuel level gauge, etc.) associated with the optical code, or other information. For example, the name may be an order number, airway bill, house airway bill, product identification number, room number, refrigerator number, package information, or any other name. The name need not be unique, though in some embodiments it may be unique, and in some embodiments the system may require the name to be unique. Mobile device 108 may transmit, to server 110, the name entered by the user. Server 110 may store, in a data entry, the name entered by the user and associate the data entry with the optical code's corresponding digital label entry. Server 110 may also update data associated with the corresponding digital label entry to indicate that the corresponding optical code has been registered.

If a code has been registered, mobile device 108 may not issue a registration prompt after subsequent scans of the code. If the user fails to register the code after being prompted, the system may not update information associated with the corresponding digital label entry in the system to indicate that the code has been registered, and mobile device 108 may issue a registration prompt after a subsequent scan of the code.

In some embodiments, after receiving, from mobile device 108, information indicating that an optical code has been scanned, server 110 may access data associated with the optical code determine whether the optical code has previously been registered. For example, server 110 may identify the digital label entry associated with the optical code, and access a data object associated with the digital label entry that stores information indicating whether the optical code has previously been registered. Server 110 may determine, based on the data, whether the optical code has previously registered and transmit, to mobile device 108, information indicating whether the optical code has previously been registered.

At step 306, based on a determination that the optical code has not previously been scanned, mobile device 108 may display an interface prompting the user to register the optical code. As above, to register a code, mobile device 108 may display an interface prompting the user to enter a name to be associated with the code.

In response to detecting an input, such as a name, from the user, mobile device 108 may transmit, to server 110, the information entered by the user. Server 110 may store, in a data object associated with the digital label entry corresponding to the optical code, the name entered by the user. Additionally, server 110 may store, in a data object associated with the digital label entry corresponding to the optical code, information indicating that the optical code has been registered and/or information indicating that the optical code has been scanned.

At step 308 mobile device 108 may automatically transmit data to server 110. In some embodiments, mobile device 108 may have access to certain data without any input or any further manual intervention from the user. For example, mobile device 108 may have one or more integrated sensors, such as GPS sensors, temperate sensors, optical sensors, speedometers, presence sensor, capacitive sensors, pressure sensors, accelerometers, gyroscopes, altimeters, or other sensors, such that the device may access and transmit data automatically, without any input or any further manual intervention from the user. In some embodiments, information accessed from the one or more sensors may be information detected by and read from the one or more sensors in response to the device scanning the optical code, while in some embodiments the information may be information that was detected by the one or more sensors before scanning the optical code, such as information read from the one or more sensor in accordance with a predefined schedule by which device 108 automatically pulls (and temporarily or permanently stores) data from the one or more sensors. Alternatively, mobile device 108 may be able to automatically, without any input or any further manual intervention from the user, access and transmit data from sensors not integrated into mobile device 108. For example, mobile device 108 may communicate with sensors over Bluetooth, Bluetooth Low Energy, Zigbee, or other communication protocol to automatically retrieve data reflecting measurements made by one or more sensors not physically integrated into device 108.

In some embodiments, mobile device 108 may ask the user for permission to access and/or transmit certain data from its integrated sensors and/or other sensors.

Server 110 may store the data automatically transmitted by mobile device 108. The data may be stored as one or more entries in a database. Server 110 may generate and store data objects corresponding to each measurement transmitted by mobile device 108 and received by server 110. The data objects may be associated with the digital label entry corresponding to the optical code. Server 110 may store additional data corresponding to each measurement, such as the time that the data was received by server 110. Server 110 may transmit information to mobile device 108 confirming receipt of the data automatically transmitted by mobile device 108.

At step 310, mobile device 108 may display an interface prompting the user to enter data required by the data profile to which the optical code corresponds. As above, characteristics of a data profile may be mandatory; that is, mobile device 108 must, in some embodiments, transmit data corresponding to such characteristics each time a corresponding optical code is scanned. In some embodiments, mobile device 108 may automatically transmit mandatory data to which it has access without any input or any further manual intervention from the user, as in step 306, above. However, in some embodiments, such as those in which mobile device 108 does not have access to mandatory data required by the data profile, mobile device 108 may display an interface prompting the user to enter mandatory data. In some embodiments, mobile device 108 may display an interface prompting the user to enter mandatory data when the data is to be read from a measuring device that is not configured for network communication with mobile device 108. For example, the user may be required to enter a temperature reading from an external temperature sensor, such as a wall-mounted, non-network-connected thermometer.

At step 312, mobile device 108 may, in response to an input from the user, such as a measurement value or an event selected from a list, transmit mandatory data to server 110. Server 110 may store the mandatory data transmitted by mobile device 108. The data may be stored as one or more entries in a database. Server 110 may generate and store data objects corresponding to each mandatory measurement transmitted by mobile device 108 and received by server 110. The data objects may be associated with the digital label entry corresponding to the optical code. Server 110 may store additional data corresponding to each mandatory measurement, such as the time that the data was received by server 110. Server 110 may transmit information to mobile device 108 confirming receipt of the mandatory data transmitted by mobile device 108.

At step 314, mobile device 108 may display an interface prompting the user to enter data permitted, but not required, by the data profile to which the optical code corresponds. As above, characteristics of a data profile may be optional; that is, data corresponding to such characteristics may be transmitted by mobile device 108 automatically after scanning an optical or upon detecting in input from a user, but is not required by the data profile. In some embodiments, mobile device 108 may automatically transmit optional data to which it has access without any input or any further manual intervention from the user, as in step 306, above. However, in some embodiments, such as when mobile device 108 does not have access to optional data required by the data profile, mobile device 108 may display an interface prompting the user to enter optional data. For example, mobile device 108 may display a prompt asking if the user wishes to enter a humidity reading from an external humidity sensor, such as a wall-mounted, non-network-connected hygrometer. In response to the prompt, the user may enter a measurement value to be transmitted to server 110, or decline to enter a value. Additionally or alternatively, mobile device 108 may display a prompt asking if the user wishes to transmit a photograph of the measured object. In response to the prompt, the user may take a photograph of the measured object that will be transmitted by mobile device 108, choose a photograph stored in the memory of mobile device 108 to be transmitted by mobile device 108, or neither.

At step 316, mobile device 108 may, in response to an input from the user, transmit optional data to server 110. Server 110 may store the optional data transmitted by mobile device 108. The data may be stored as one or more entries in a database. Server 110 may generate and store data objects corresponding to each optional measurement transmitted by mobile device 108 and received by server 110. The data objects may be associated with the digital label entry corresponding to the optical code. Server 110 may store additional data corresponding to each optional measurement, such as the time that the data was received by server 110. Server 110 may transmit information to mobile device 108 confirming receipt of the optional data transmitted by mobile device 108.

In some embodiments, system 100 may not require authentication or proof of the identity of the user. That is, any user who has access to an optical code and/or the information encoded therein may transmit data corresponding to the optical code. Furthermore, in some embodiments, mobile device 108 may not transmit data that identifies the device that scanned the code and/or the user of the device that scanned the code. One or both of these features may increase anonymity of end users submitting measurements, thereby mitigating privacy concerns for end-users by creating a system that tracks and/or measures objects rather than tracking and/or measuring users or devices. Alternately, in some embodiments, system 100 may be configured to require user authentication and/or to record data tracking devices and/or users that upload measurements or other information; in some embodiments, system 100 may be able to be configured by a user in order to change one or more settings regarding anonymity, authentication, and/or user/device tracking.

In some embodiments, in addition to storing data received from mobile device 108, server 110 may process data received from mobile device 108. For example, if mobile device 108 transmits GPS coordinates, server 110 may process the coordinates to associate the object with a particular building, such as a warehouse or the like, based on a lookup table or other information available to server 110.

FIGS. 4A-E show various graphical user interfaces 402a-402e for configuring and managing a data collection system, in accordance with some embodiments. Interfaces 402a-402e allow for the creation of data profiles and viewing information regarding digital label entries. The interfaces allow a user to view a list of one or more digital label entries and view information and data associated with a single data entry. The interfaces also allow a user to view a virtual representation of digital label images associated with one or more digital label entry.

In some embodiments, interfaces 402a-402e may be displayed by terminal 200 of system 100. In other embodiments, interfaces 402a-402e may be displayed by any electronic computing device, such as a laptop computer, desktop computer, smart-phone, tablet, or other electronic computing device configured to display one or more of interfaces 402a-402e and to receive one or more inputs from a user, as discussed herein, to control the operation of the interface and operation of a data collection system such as system 100. In some embodiments, execution of all or part of method 200, as discussed above, may include displaying one or more of the interfaces shown in FIGS. 4A-E.

Below, interfaces 402a-402e are discussed with respect to FIGS. 4A-4E in greater detail. Interfaces 402a-402e may, in some embodiments, be interrelated interfaces of a single program or application configured to be used in connection with one another. For example, each of the interfaces 402a-402e may be different screens that are selectively accessible from a mobile application or other computer program configured to work in conjunction with one or more electronic devices in order to configure and manage a data collection system.

Figure 4A:
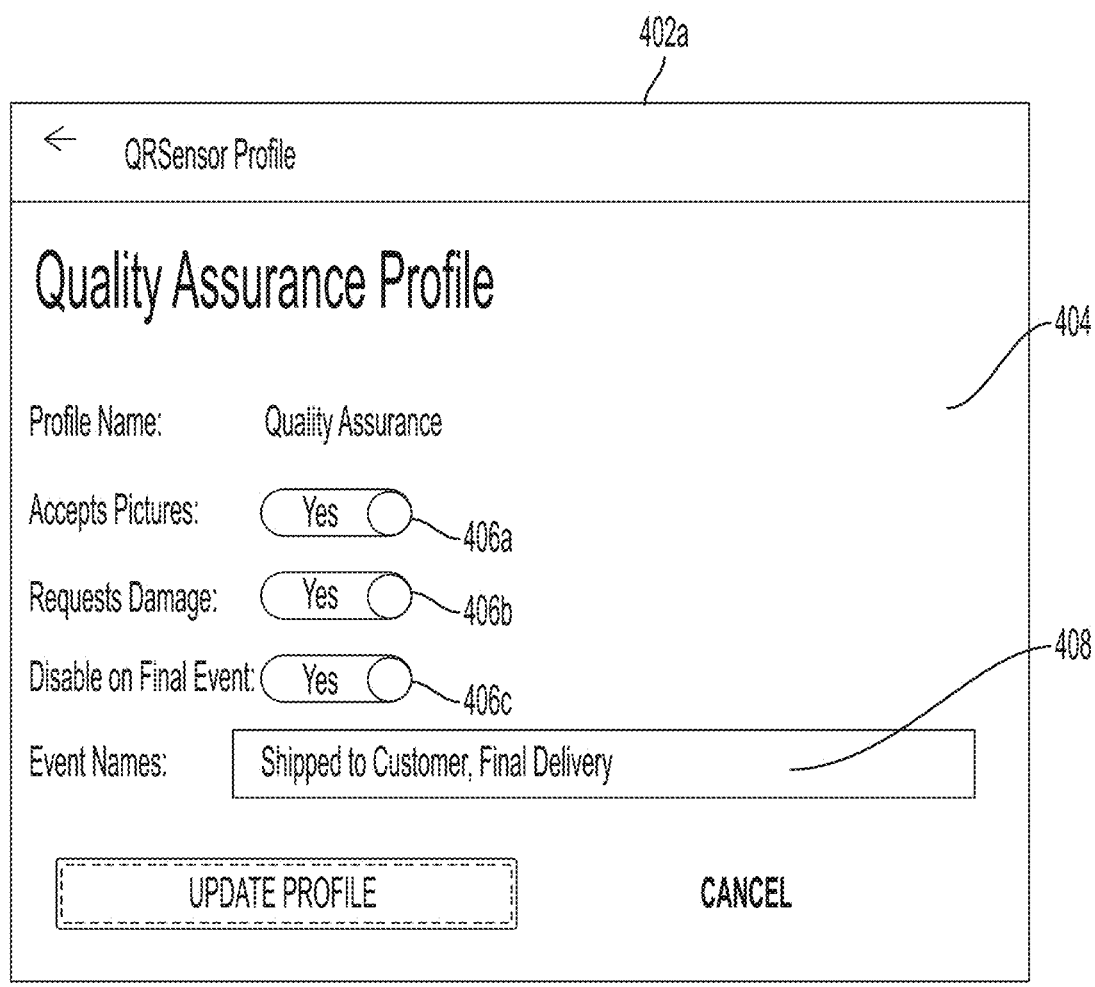
FIG. 4A is an exemplary depiction of an interface for creating a data profile, according to some embodiments.

FIG. 4A shows data profile definition interface 402a, according to some embodiments. Data profile creation interface 402a may, in some embodiments, be an interface configured to allow a user to create or modify a data profile by naming the profile and defining characteristics to be associated with the data profile.

In some embodiments, data profile definition interface 402a may comprise profile name field 404. In some embodiments, profile name field 404 may be a text field configured to accept input from a user. In some embodiments, a user may enter a name in profile name field 404 to be associated with the data profile.

In some embodiments, data profile definition interface 402a may comprise one or more characteristic toggle icons 406a-406c that allow a user to select pre-defined characteristics to be associated with the data profile. In some embodiments, a user may select one or more of characteristic toggle icons 406a-406c to associate the corresponding characteristic with the data profile. In the example for FIG. 4A, characteristic toggle icons 406a-406c may allow a user to choose whether a data profile accepts pictures, whether a data profile requests information regarding whether or not an object is damaged, and/or whether a digital label entry and/or optical code associated with the data profile is disabled after a final event is received. Some embodiments may allow a user to choose whether or not additional pre-defined characteristics are associated with a data profile. In some embodiments, characteristic toggle icons 406a-406c may be interactive affordances, in that they may be clicked, tapped, pressed, or otherwise selected in order to indicate selection or deselection of the corresponding characteristic.

In some embodiments, data profile definition interface 402*a* may comprise one or more characteristics fields 408. In some embodiments, characteristics field 408 may be a text field configured to accept input from a user. In some embodiments, characteristics field 408 may be configured to allow a user to enter text corresponding to one or more characteristics (for example, multiple characteristics may be delineated by commas, semicolons, or another suitable notation). In some embodiments, characteristics field 408 may be configured to accept measurement characteristics, event characteristics, and/or other characteristics to be associated with the data profile.

Figure 4B:
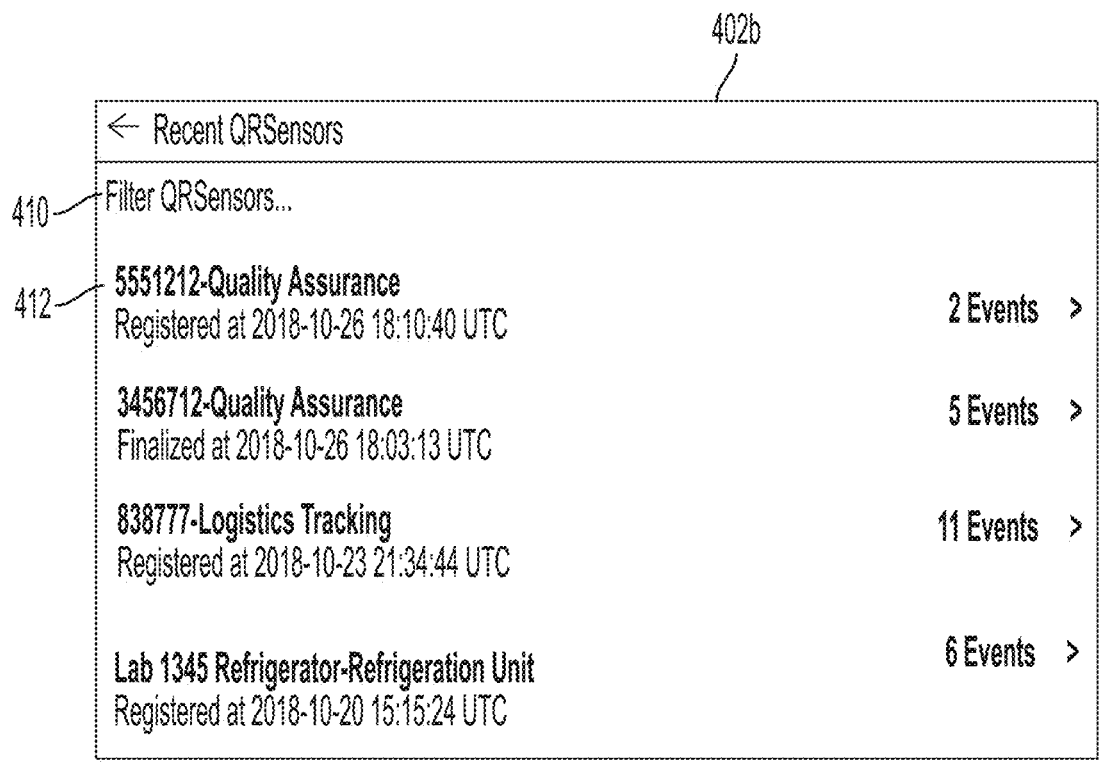
FIG. 4B is an exemplary depiction of an interface for viewing a list of recently scanned labels, according to some embodiments.

FIG. 4B shows digital label entry list interface 402*b*, according to some embodiments. Digital label entry list interface 402*b* may, in some embodiments, be an interface configured to allow a user to view a list of and/or select one or more digital label entries.

In some embodiments, digital label entry list interface 402*b* may be configured to allow a user to sort and/or filter a list of digital label entries according to various criteria. For example, in some embodiments, digital label entry list interface 402*b* may comprise filter field 410. In some embodiments, filter field 410 may allow a user to input information causing digital label entry list interface 402*b* to filter the list of digital label entries according to some criteria. In some embodiments, filter field 410 may be a text field configured to accept input from a user. A user may enter text causing the interface to modify the list of digital label entries according to the filtering criteria entered by the user in filter field 410, such as to only show digital label entries having one or more characteristics or features that match the text entered into filter field 410. In some embodiments, filter field 410 may be a drop-down menu, in that, when selected by a user, digital label entry list interface 402*b* may display a list of pre-defined criteria from which the user may choose to filter the list of digital label entries. For example, a user may choose to filter the list of digital label entries by data profile, by time elapsed since the digital label entry was created, by time elapsed since the digital label entry received data, by measurement characteristic, by whether a digital label entry has been registered, or by other property.

In other embodiments, filter field 410 may allow a user to input information causing digital label entry list interface 402*b* to sort the list of digital label entries according to some criteria. In some embodiments, a user may enter text causing the interface to modify the list of digital label entries according to the sorting criteria entered by the user in filter field 410. In other embodiments, filter field 410 may be a drop-down menu, in that, when selected by a user, digital label entry list interface 402*b* may display a list of pre-defined criteria from which the user may choose to sort the list of digital label entries. For example, a user may choose to sort the list of digital label entries by data profile, by date when each digital label entry was created, by date when the digital label entry received data, by the number of times data has been received corresponding to the digital label entry, and/or by one or more other properties.

In some embodiments, digital label entry list interface 402*b* may comprise one or more list entry 412. Each list entry may correspond to one digital label entry. In some embodiments, each list entry may display information associated with the corresponding digital label entry. For example, each list entry may display a name, data profile, registration time, time when a final event was received, the number of measurement events received, and/or other information associated with the digital label entry. As shown in FIG. 4B, label entry 412 shows the name associated with a digital label entry entered by a user at the time of registration ("5551212"), the data profile associated with the digital label entry ("Quality Assurance"), the time when the digital label entry was registered, and the number of events received associated with the digital label entry ("2 Events").

In some embodiments, list entries 412 may be an interactive affordance, in that it may be tapped, clicked, pressed, or otherwise selected in order to active functionality. In some embodiments, digital label entry list interface 402*b* may be configured to allow a user to select a list entry 412 to cause the interface to display further information associated with the corresponding digital label entry, such as a digital label entry properties interface 402*c*, described below.

FIG. 4C shows digital label entry properties interface 402*c*, according to some embodiments. Digital label entry properties interface 402*c* may, in some embodiments, be an interface configured to show one or more properties associated with a single digital label entry.

In some embodiments, digital label entry properties interface 402*c* may comprise one or more property fields 414*a*-414*f*. A property field may display information regarding one or more properties associated with a digital label entry. A property field may display any property associated with the digital label entry. For example, each property field may display an account name, registration name, UUID, data model, data profile, time of registration, time when the last event was received, the total number of events received, whether the digital label entry has received a final entry, whether the digital label entry has been registered, and/or other information associated with the digital label entry. As shown in FIG. 4C, property fields 414*a*-414*f* display, respectively, a digital label entry's account name ("PharmaCo, Inc"), registration name ("678345"), UUID, data model ("GPS and Temperature QRSensor"), data profile ("Logistics Tracking"), and time of registration.

Figure 4D:
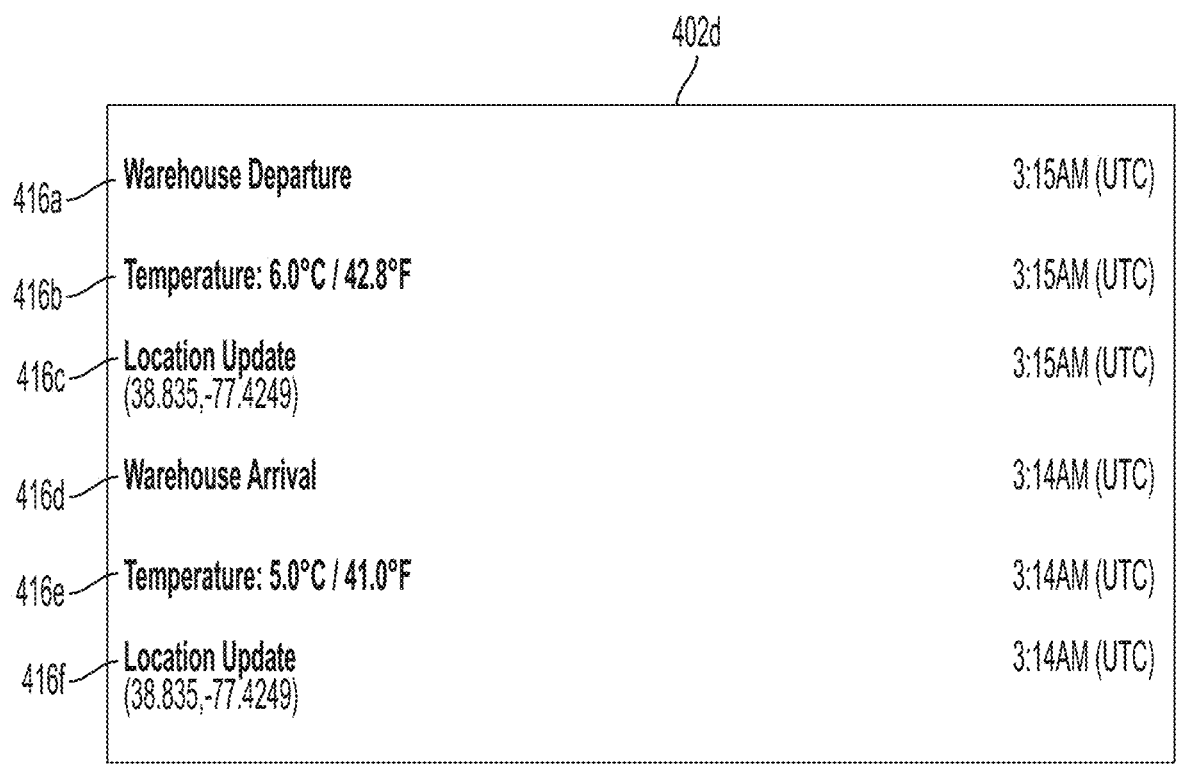
FIG. 4D is an exemplary depiction of an interface for viewing recently received data entries for a digital label entry, according to some embodiments.

FIG. 4D shows data history interface 402*d*, according to some embodiments. Data history interface 402*d* may, in some embodiments, be an interface configured to show one or more data entries associated with a digital label entry.

In some embodiments, data history interface 402*d* may comprise one or more data entries 416*a*-416*f*. A data entry may display one or more pieces of information associated with a digital label entry. For example, a data entry may display a measurement value and a timestamp value. In some embodiments, a data entry may display a photograph. A data entry may correspond to one or more measurements received, from mobile device 108, when a digital label entry's corresponding optical code was scanned by mobile device 108 and corresponding information was transmitted from mobile device 108. As shown in FIG. 4D, data entries 416*a*-416*f* may be displayed in reverse chronological orders. In other embodiments, data entries may be displayed in chronological order, by measurement type, or other ordering scheme. As shown in FIG. 4D, data entries 416*a*-416*f* display, respectively, a "Warehouse Departure" event, a "Temperature" measurement, a first "Location Update," a "Warehouse Arrival" event, a second "Temperature" measurement, and a second "Location Update."

Figure 4E:
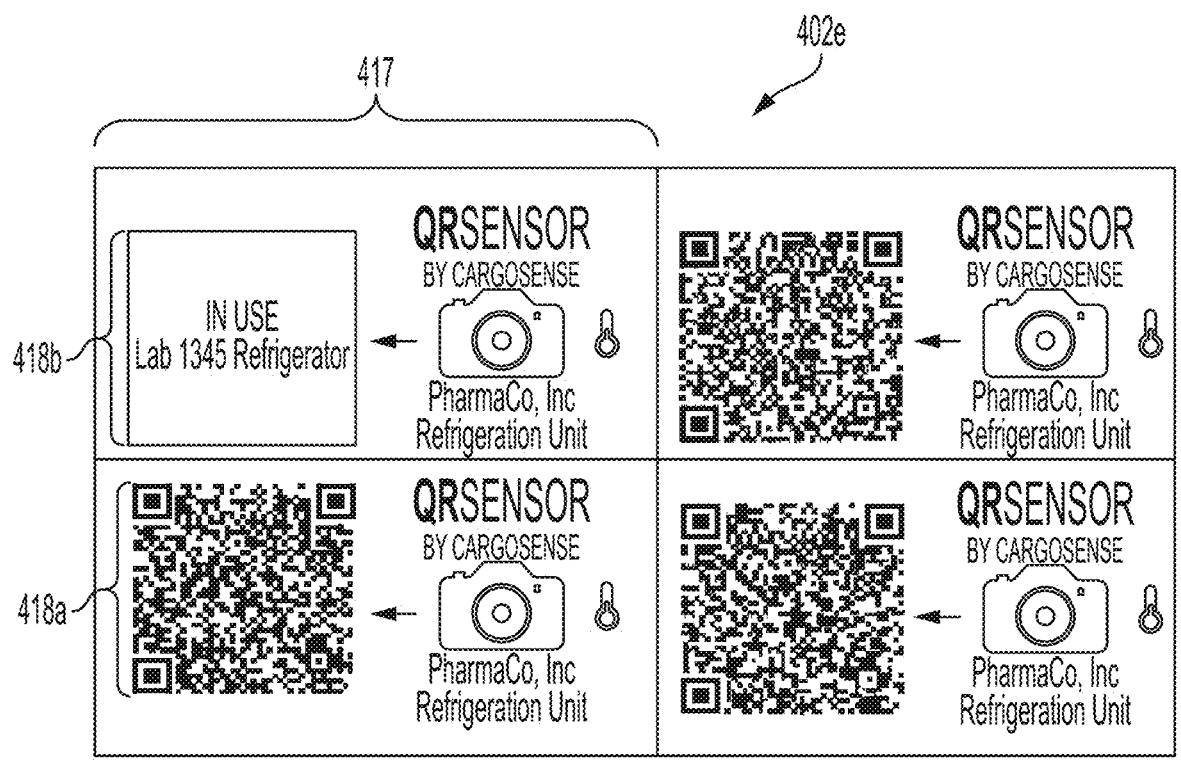
FIG. 4E is an exemplary depiction of dynamic virtual representation of digital label entries associated with a data profile, according to some embodiments.

FIG. 4E shows virtual label interface 402*e*, according to some embodiments. Virtual label interface 402*e* may, in some embodiments, be an interface configured to show one or more visual representations of information associated with digital label entries. In some embodiments, virtual interface 402*e* may comprise one or more digital label images 417 associated with one or more digital label entries.

In other embodiments, virtual interface 402e may comprise one or more digital label images 417 corresponding to a single data profile.

In some embodiments, virtual label interface 402e may comprise a particular arrangement (e.g., a "sheet") of digital label images 417, such as an arrangement forming a printable image (e.g., an image in an arrangement suitable for printing) comprising a plurality of digital label images 417. In some embodiments, an arrangement suitable for printing may be configured such that the digital label images 417 are arranged and/or scaled in a manner so as to fit onto a standard sized paper when printed, such as industry-standard and/or user selected printer paper and/or label paper.

In some embodiments, server 110 may dynamically generate the content of virtual label interface 402e each time it is displayed. For example, in some embodiments, server 110 may generate virtual label interface 402e based on the respective optical codes associated with each digital label entry, the respective data profiles associated with each digital label entry, the respective names of digital label entries assigned by the user, and/or other information. In other embodiments, server 110 may dynamically generate virtual label interface 402e based on a determination as to whether one or more optical codes respectively associated with digital label entries have previously been scanned and/or registered. For example, virtual label interface 402e may comprise one or more status indicators 418a-418b corresponding to each digital label entry represented by the interface.

As shown by status indicator 418b in FIG. 4E, in accordance with a determination that the optical code associated with a digital label entry has previously been scanned and/or registered, server 110 may remove, obscure, and/or otherwise modify the optical code from virtual label interface 402e. In the example shown, the optical code is removed and replaced the by an "In Use" visual indicator to (a) indicate to a user that the code is registered and to (b) prevent the user from re-printing the label and attempting to re-use it in association with a different object to be tracked. Alternatively, as shown by status indicator 418a in FIG. 4E, in accordance with a determination that the optical code associated with a digital label entry has not previously been scanned and/or registered, server 110 may display the optical code as part of virtual label interface 402e. In some embodiments, removal, obfuscation, and/or modification of an optical code and/or the associated digital label image 417 may be performed without rearranging any of the visual representations of labels on the sheet; that is, a blank space may be maintained on a virtual visual representation of a sheet, following registration of a label, at the location on the sheet where the unmodified virtual visual representation of the label previously would have been displayed. In this way, a virtual visual representation of a sheet of labels may visually reflect a corresponding physical sheet of labels/stickers, in that labels that have been removed from a sheet and registered for use may be virtually visually "removed" from the virtual visual representation of the sheet, while labels that have not yet been removed from the sheet and registered for use may continue to be virtually visually represented in the same position on the virtual visual representation of the sheet.

FIGS. 5A-D show various graphical user interfaces 502a-502d for entering and transmitting data, in accordance with some embodiments. Interfaces 502a-502d allow a user to enter and transmit measurement data and other information corresponding to a detected optical code associated with an object.

In some embodiments, interfaces 502a-502d may be displayed by mobile device 108 of system 100. In other embodiments, interfaces 502a-502d may be displayed by any electronic computing device, such as a laptop computer, desktop computer, smart-phone, tablet, or other electronic computing device configured to display one or more of interfaces 502a-502d and to receive one or more inputs from a user, as discussed herein, to enter measurement data or other information. In some embodiments, execution of all or part of method 300, as discussed above, may include displaying one or more of the interfaces shown in FIGS. 5A-D.

Below, interfaces 502a-502d are discussed with respect to FIGS. 5A-5D in greater detail. Interfaces 502a-502d may, in some embodiments, be interrelated interfaces of a single program or application configured to be used in connection with one another. For example, each of the interfaces 502a-502d may be different screens that are selectively accessible from a mobile application or other computer program configured to work in conjunction with one or more electronic devices in order to enter data into a data collection system.

Figure 5A:
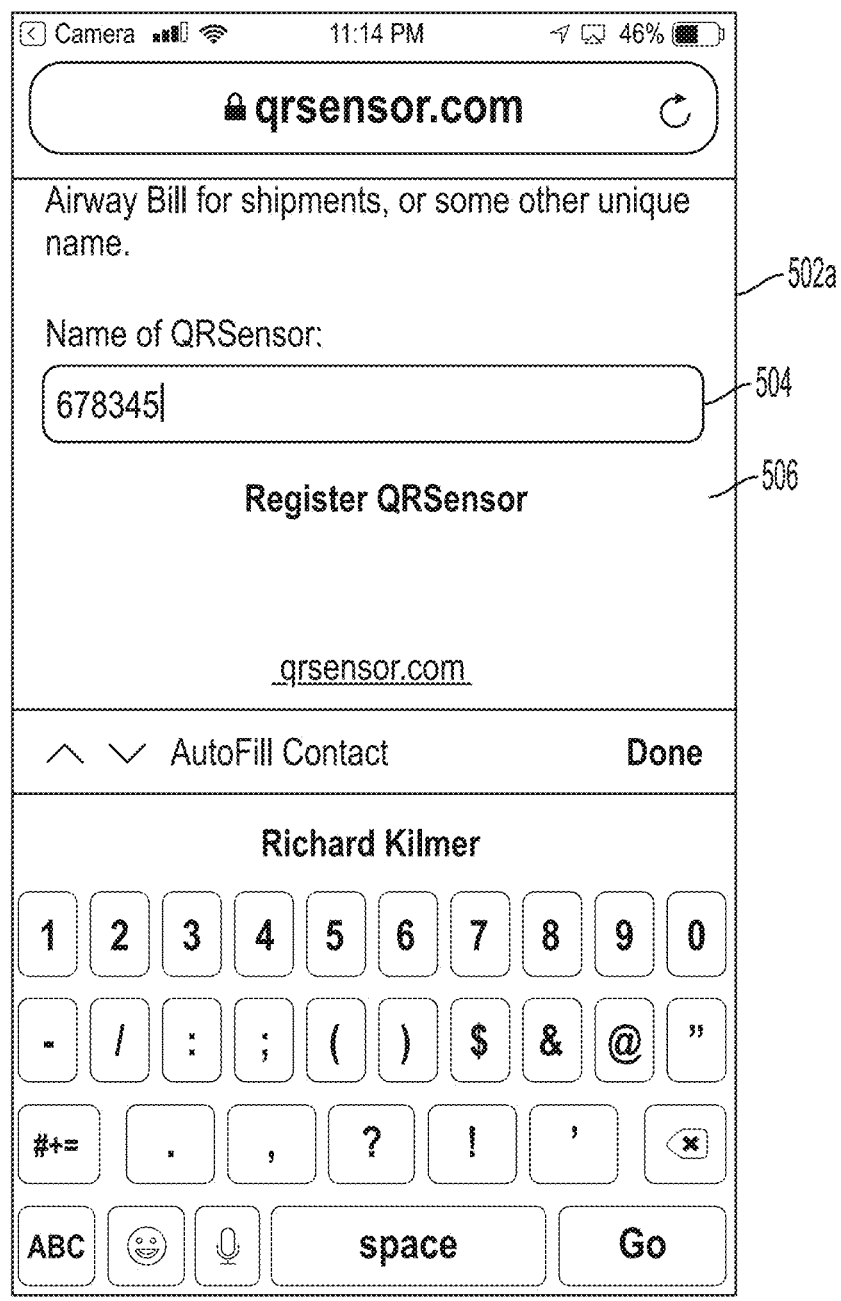
FIG. 5A is an exemplary depiction of an interface for registering a physical label, according to some embodiments.

FIG. 5A shows label registration interface 502a, according to some embodiments. Label registration interface 502a may, in some embodiments, be an interface configured to allow a user to register a label after mobile device 108 detects, by one or more optical sensors of mobile device 108, an optical code corresponding to a label.

When an optical code is detected by mobile device 108, mobile device 108 may prompt the user to register the label—that is, enter a name to be associated with the object—if the optical code has not previously been successfully registered. In some embodiments, the name may be an order number, airway bill, house airway bill, product identification number, room number, refrigerator number, package information, or any other name. The name need not be unique.

In some embodiments, label registration interface 502a may comprise registration name field 504 and registration submission icon 506. In some embodiments, registration name field 504 may be a text field configured to accept input from a user. In some embodiments, a user may enter a name in registration name field 504 to be associated with the detected label. After a user has entered information in registration name field 504, the user may select registration submission icon 506 to cause mobile device 108 to transmit the registration information to server 110. In some embodiments, registration icon 506 may be an interactive affordance, in that it may be clicked, tapped, pressed, or otherwise selected in order to cause mobile device 108 to transmit the registration information to server 110.

Figure 5B:
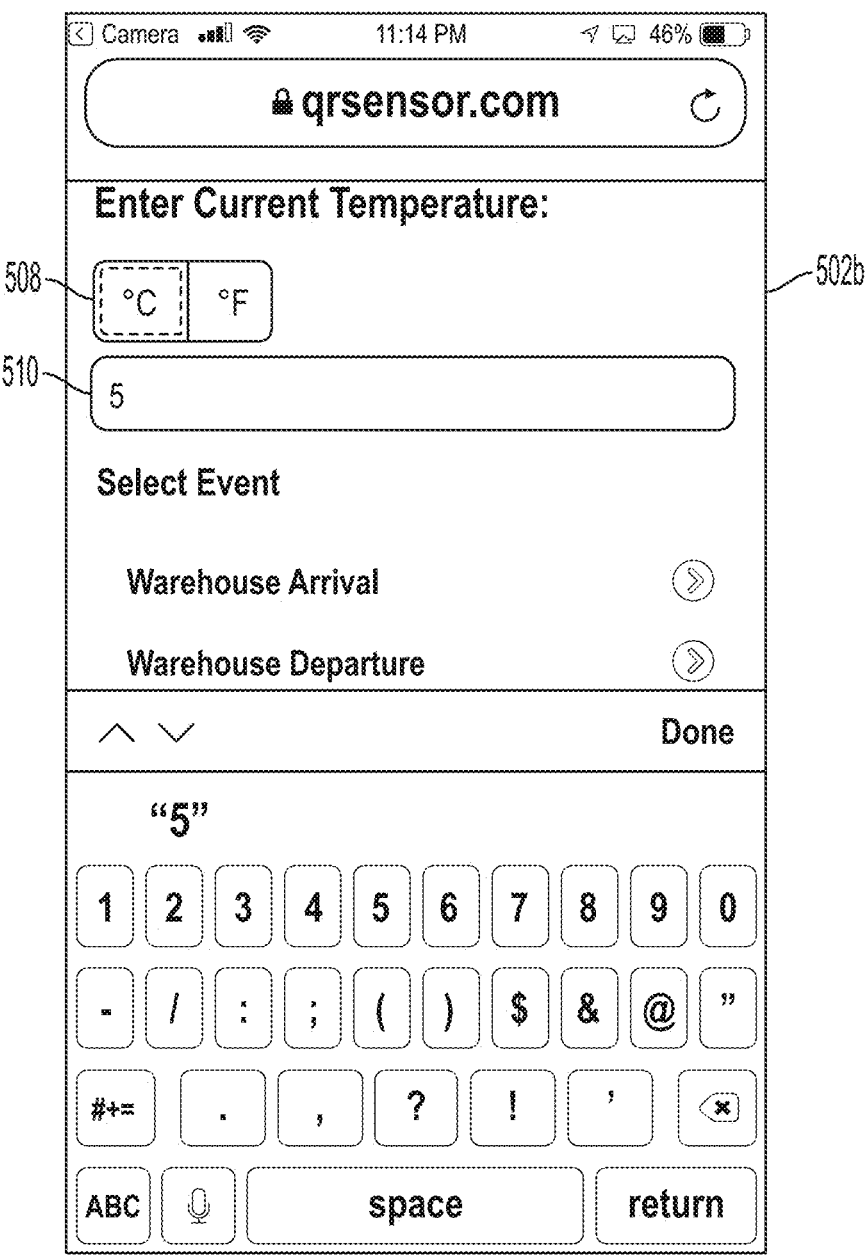
FIG. 5B is an exemplary depiction of an interface for prompting the entry of measurement data, according to some embodiments.

FIG. 5B shows measurement entry interface 502b, according to some embodiments. Measurement interface 502b may, in some embodiments, be an interface configured to allow a user to enter one or more measurements associated with an object.

In some embodiments, measurement entry interface 502b may comprise one or more measurement toggle icons 508 that allow a user to select for which measurement data is to be entered, and/or to select parameters corresponding to a particular measurement. For example, toggle icon 508 may allow a user to select between a temperature measurement and a pressure measurement. Additionally or alternatively, measurement toggle icon 508 may allow a user to select the units in which a measurement are to be entered, such as selecting whether a temperature measurement is to be entered in degrees Celsius or degrees Fahrenheit, as shown in FIG. 5B. In some embodiments, measurement toggle icons 508 may be interactive affordances, in that they may be clicked, tapped, pressed, or otherwise selected in order to switch between measurements to be entered and/or units to be used.

In some embodiments, measurement entry interface 502b may comprise measurement field 510. In some embodiments, measurement field 510 may be a text field configured to accept input from a user. In some embodiments, measurement field 510 may be configured to only accept certain types of input, such as integers, decimals, alpha-numeric text, or other forms of input. In other embodiments, measurement field 510 may comprise a drop-down menu or number-wheel interface configured to allow a user to choose a measurement value from a pre-defined set of numbers.

In some embodiments, a user may enter measurement data in measurement field 510 to be associated with the detected label. After a user has entered information in measurement field 510, the user may select a measurement submission icon to cause mobile device 108 to transmit the measurement data to server 110.

Figure 5C:
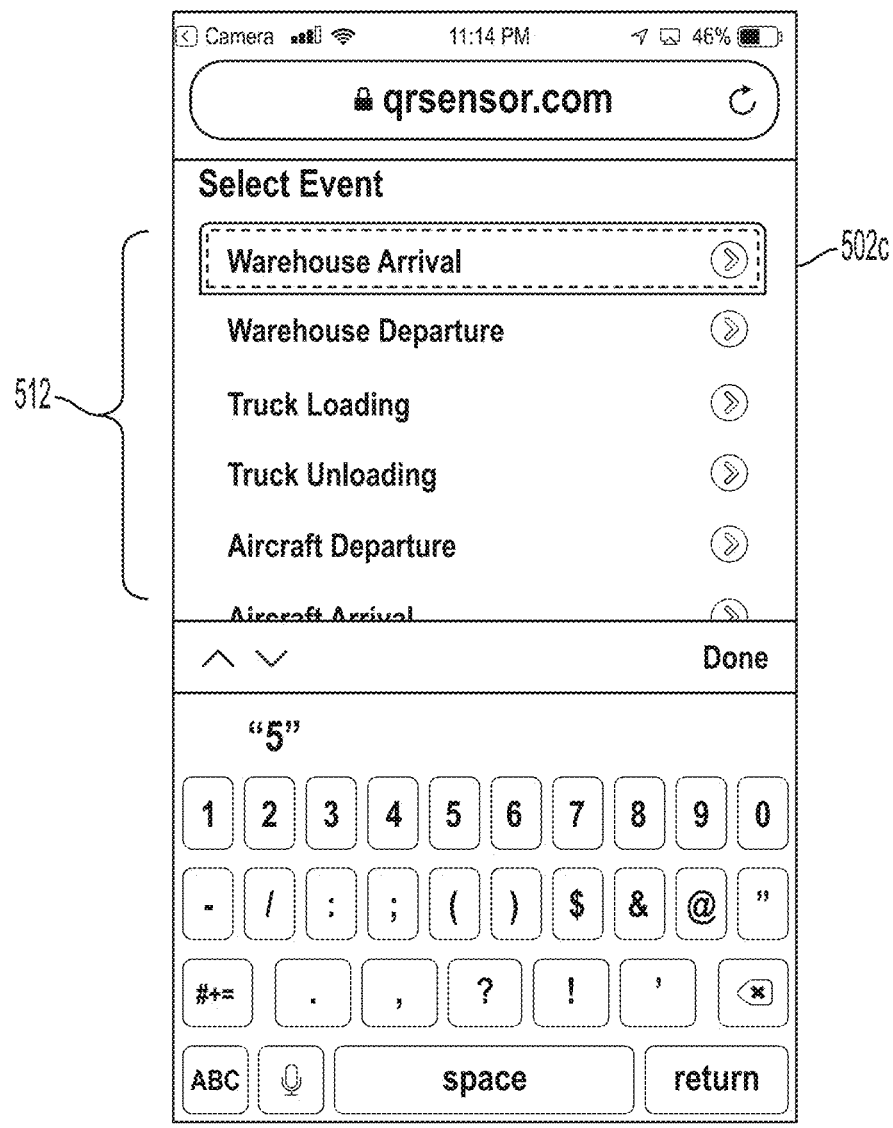
FIG. 5C is an exemplary depiction of an interface for prompting the entry of an event, according to some embodiments.

FIG. 5C shows event entry interface 502c, according to some embodiments. Event entry interface 502c may, in some embodiments, be an interface configured to allow a user to enter one or more events associated with an object. In some embodiments, interface 502c may be a scrolled-down version of interface 502b, in that the options and functionalities presented in interface 502c may be available in addition to or as one or more alternate options to the options and functionalities presented in interface 502b.

In some embodiments, event entry interface 502c may comprise one or more event fields 512. In some embodiments, event field 512 may be a pre-defined list of events from which a user may choose an event to associate with the present scan of an optical code. In other embodiments, event field 512 may be a drop-down menu or wheel-interface that permits a user to choose an event from a pre-defined set of events. In some embodiments, event field 512 may be dynamically populated with a list of permissible events based on the events that the optical code's corresponding data profile has been defined to accept. In some embodiments, the list or set of available events that are presented to a user in interface 502c may correspond to events entered in a data profile definition interface such as interface 402a, as discussed above with reference to FIG. 4A.

Event field 512 may also be a text field configured to accept input from a user. A user may enter text into event field 512 to identify an event to be associated with the corresponding optical code. In some embodiments, event fields 512 may be interactive affordances, in that they may be clicked, tapped, pressed, or otherwise selected in order to select the corresponding event and/or to activate additional functionality of the graphical user interface. After a user has selected one or more of event fields 512 and/or entered information corresponding to the selected event, the user may select an event submission icon to cause mobile device 108 to transmit the event data to server 110.

Figure 5D:
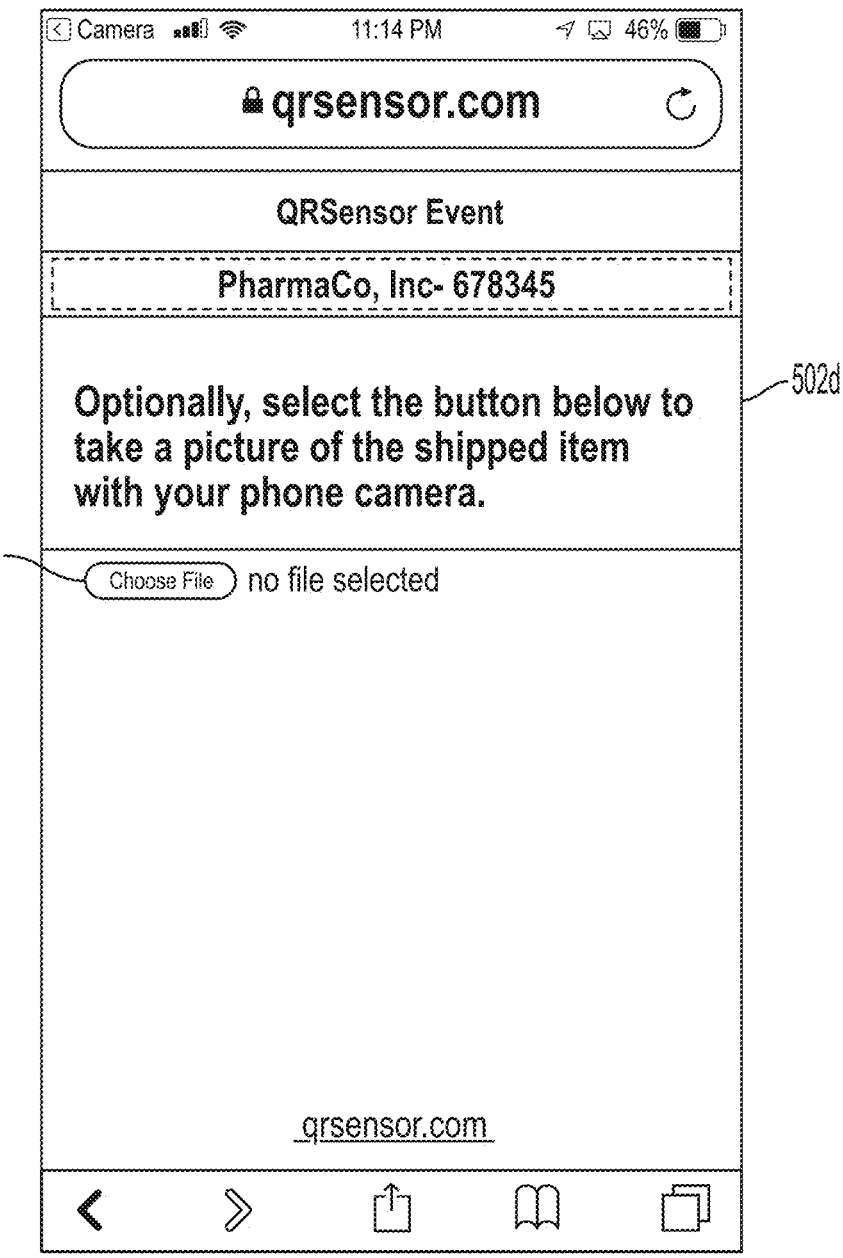
FIG. 5D is an exemplary depiction of an interface for prompting the entry of a photograph, according to some embodiments.

FIG. 5D shows photograph entry interface 502d, according to some embodiments. Photograph entry interface 502d may, in some embodiments, be an interface configured to allow a user to enter one or more photographs associated with an object. In some embodiments, mobile device 108 may automatically display photograph entry interface 502d after a user has submitted measurement and/or event information. In other embodiments, a user may select a photograph icon to cause mobile device 108 to display photograph entry interface 502d.

In some embodiments, photograph entry interface 502d may comprise photo selection affordance 514. Photo selection affordance 514 may allow a user to choose the source of a photograph to be transmitted. In some embodiments, photo selection affordance 514 may allow a user to choose to engage a camera associated with mobile device 108 to take a photograph to transmit to server 110. In other embodiments, photo selection affordance 514 may allow a user to choose to select a photograph stored in the memory of mobile device 108 to transmit to server 110.

FIG. 5D is an exemplary depiction of an interface displayed by mobile device 108 for prompting the entry of a photograph, according to some embodiments. In some embodiments, the data profile may be defined to accept (and in some embodiments to require) photographs. The mobile interface may prompt the user to take a photograph of and/or associated with the object, or to select a photograph stored in the memory of mobile device 108, such that the captured and/or selected photograph may be transmitted from mobile device 108 in association with other information transmitted regarding the measurements taken or events recorded. In some embodiments, photo selection affordance 514 may be interactive affordances, in that they may be clicked, tapped, pressed, or otherwise selected in order to activate functionality of the graphical user interface. After a user has selected a photograph to be transmitted, the user may select a photo submission icon to cause mobile device 108 to transmit the photograph to server 110.

Figure 6:
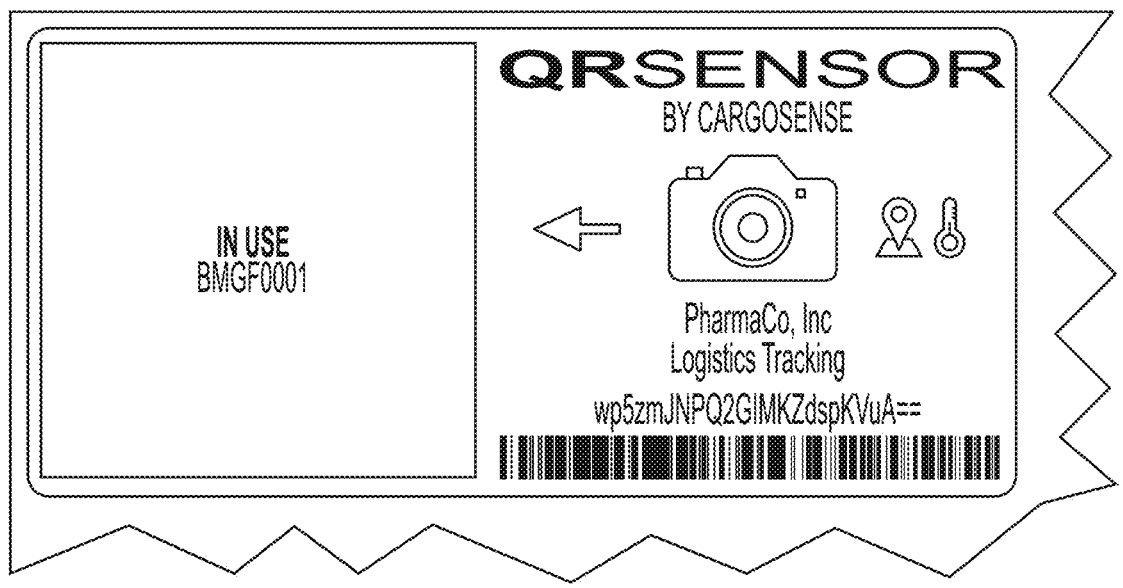
FIG. 6 is a depiction of physical label as a printed sticker, according to some embodiments.

FIG. 6 is a depiction of a physical label in the form of a printed sticker, according to some embodiments. In some embodiments, server 110 may generate digital label images associated with a digital label entry in a printable form. In some embodiments, server 110 may generate printable form images that comprise a plurality of digital label images in an arrangement suitable for printing. In some embodiments, the digital label images may be arranged in a manner suitable for printing to adhesive paper suitable for printing stickers. In some embodiments, the digital label images may be arranged into a grid or array suitable for printing the labels on commercially available adhesive label paper, such as Avery 5163 Shipping Labels.

The digital label images may be grouped according to their data profile, names, and/or other property. Printed labels may be adhered to (or nearby to) measurable objects to identify the objects in the system.

Figure 7:
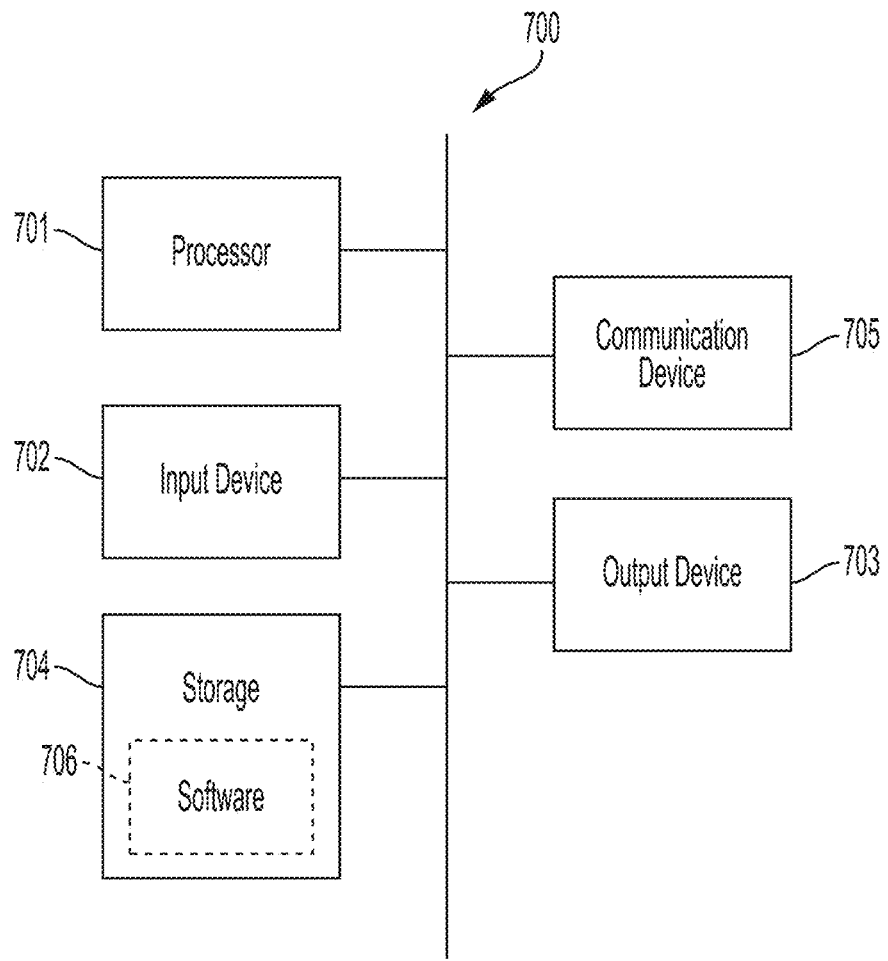
FIG. 7 is a functional block diagram of a computer in accordance with some embodiments.

FIG. 7 illustrates an example of a computer in accordance with one embodiment. Computer 700 can be a component of a data collection system for configuring the system and viewing the collected data. In some embodiments, computer 700 is configured to execute a method for configuring a data collection system, such as method 200 of FIG. 2. Alternatively, computer 700 can be configured to execute a method for measuring and recording a characteristic of an object, such as method 300 of FIG. 3.

Computer 700 can be a host computer connected to a network. Computer 700 can be a client computer or a server. As shown in FIG. 7, computer 700 can be any suitable type of microprocessor-based device, such as a personal computer, workstation, server, videogame console, or handheld computing device, such as a phone or tablet. The computer can include, for example, one or more of processor 701, input device 702, output device 703, storage 704, and communication device 705. Input device 702 can generally correspond to those described above and can either be connectable or integrated with the computer.

Input device 702 can be any suitable device that provides input, such as a touch screen or monitor, keyboard, mouse, or voice-recognition device. Output device 703 can be any suitable device that provides output, such as a touch screen, monitor, printer, disk drive, or speaker.

Storage 704 can be any suitable device that provides storage, such as an electrical, magnetic, or optical memory, including a RAM, cache, hard drive, CD-ROM drive, tape drive, or removable storage disk. Communication device 705 can include any suitable device capable of transmitting and receiving signals over a network, such as a network interface chip or card. The components of the computer can be connected in any suitable manner, such as via a physical bus or wirelessly. Storage 704 can be a non-transitory computer-readable storage medium comprising one or more programs, which, when executed by one or more processors, such as processor 701, cause the one or more processors to execute methods described herein.

Software 706, which can be stored in storage 704 and executed by processor 701, can include, for example, the programming that embodies the functionality of the present disclosure (e.g., as embodied in the systems, computers, servers, and/or devices as described above). In some embodiments, software 706 can be implemented and executed on a combination of servers such as application servers and database servers.

Software 706, or part thereof, can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 704, that can contain or store programming for use by or in connection with an instruction execution system, apparatus, or device.

Software 706 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 700 can implement any operating system suitable for operating the network. Software 706 can be written in any suitable programming language, such as C, C++, Java, or Python. In various embodiments, application software embodying the functionality of the present disclosure can be deployed in different configurations, such as in a client/server arrangement or through a web browser as a Web-based application or Web service, for example.

The foregoing description sets forth exemplary models, parameters and the like. It should be recognized, however, that such description is not intended as a limitation on the scope of the present disclosure but is instead provided as a description of exemplary embodiments. The illustrative embodiments described above are not intended to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. In the foregoing description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the foregoing description uses terms first, second, etc. to describe various elements, these elements should not be limited by the terms. These terms are only used to distinguish one element from another. In addition, it is also to be understood that the singular forms "a," "an," and "the" used in the foregoing description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present disclosure also relates to a device for performing the operations herein. This device may be specially constructed for the required purposes, or it may include a general purpose computer selectively activated or reconfigured by a computer program stored in the computer. Such a computer program may be stored in a non-transitory, computer readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

The invention claimed is:

1. A method for detecting and recording event information associated with an object, comprising:
    at a device comprising a display, an optical sensor, a GPS sensor, one or more processors, and memory:
        detecting, by the optical sensor, an optical code, wherein the optical code is physically associated with an object;
        in response to detecting the optical code:
            decoding an identifying value encoded in the optical code; and
            transmitting geographic information from the GPS sensor to a remote server, wherein the geographic information is transmitted in accordance with the decoded identifying value; and
            transmitting event information associated with the object, the event information being distinct from the geographic information, to the remote server, wherein the event information is transmitted in accordance with the decoded identifying value.

2. The method of claim 1, further comprising:
    in response to detecting the optical code, displaying a prompt for a user to enter event information associated with the object.

3. The method of claim 2, wherein displaying the prompt comprises displaying a list of event types.

4. The method of claim 1, wherein the identifying value uniquely corresponds to an entry in a database.

5. The method of claim 4, further comprising:
    in response to detecting the optical code, in accordance with a determination that registration transmission has not previously been transmitted to the remote server in response to detection of the optical code, displaying a registration interface comprising a user interface object configured to accept a user input comprising information associated with registering the optical code;
    detecting an instruction from the user to transmit the information associated with registering the optical code; and
    in response to receiving the instruction to transmit the information associated with registering the optical code, transmitting an instruction to the remote server to register the optical code by uniquely associating the entry in the database with the information associated with registering the optical code.

6. The method of claim 5, wherein the information associated with registering the optical code comprises an identifier associated with the object.

7. The method of claim 4, wherein the identifying value comprises a URL corresponding to the entry in the database.

8. The method of claim 1, wherein the optical code comprises a QR code.

9. The method of claim 1, wherein the event information corresponds to an event that is designated as a final event.

10. The method of claim 1, comprising:
    at a server:
        receiving the geographic information and receiving the event information associated with the object; and
        in response to receiving the event information associated with the object, storing a data entry indicating the geographic information and indicating the event information in a database.

11. The method of claim 10, comprising, at the server:
    in response to receiving the event information, determining that the event information designates a final event; and
    in response to determining that the event information designates a final event, updating a digital label entry such that the server will no longer accept event information for the object.

12. The method of claim 10, comprising, at the server:
    in response to receiving the event information, determining that the event information designates a final event; and
    in response to determining that the event information designates a final event, updating a digital label entry such that the optical code is deactivated.

13. A device for detecting and recording event information associated with an object, the device comprising a display, an optical sensor, a GPS sensor, one or more processors, and memory storing instructions executable by the one or more processors to cause the device to:
    detect, by the optical sensor, an optical code, wherein the optical code is physically associated with an object;
    in response to detecting the optical code:
        decode an identifying value encoded in the optical code; and
        transmit geographic information from the GPS sensor to a remote server, wherein the geographic information is transmitted in accordance with the decoded identifying value; and
        transmit event information associated with the object, the event information being distinct from the geographic information, to the remote server, wherein the event information is transmitted in accordance with the decoded identifying value.

14. A non-transitory computer-readable storage medium storing instructions for detecting and recording event information associated with an object, the instructions configured to be executed by one or more processors of a device comprising a display, an optical sensor, a GPS sensor, and one or more processors, the instructions configured to cause the device to:
    detect, by the optical sensor, an optical code, wherein the optical code is physically associated with an object;
    in response to detecting the optical code:
        decode an identifying value encoded in the optical code; and
        transmit geographic information from the GPS sensor to a remote server, wherein the geographic information is transmitted in accordance with the decoded identifying value; and
        transmit event information associated with the object, the event information being distinct from the geographic information, to the remote server, wherein the event information is transmitted in accordance with the decoded identifying value.

15. A method for configuring a data collection system, comprising:
    at a system comprising a display, one or more processors, and memory:

detecting a first user input, wherein the first user input comprises an instruction to generate a set of database entries for monitoring respective objects, and wherein the first user input indicates a set of event types associated with the objects to be monitored;

in response to detecting the first user input:
creating a set of database entries, wherein each entry of the set of database entries is configured to store data regarding the event types associated with the respective objects; and
generating a set of optical codes, wherein each code of the set of optical codes uniquely corresponds to one of the database entries created;

detecting a second user input, wherein the second user input comprises an instruction to display a plurality of images associated respectively with a subset of the set of database entries, wherein each image of the plurality of images uniquely corresponds to a respective one of the set of database entries; and in response to detecting the second user input, displaying a dynamic visual representation of the plurality of images, wherein, for each of the plurality of images, the image visually indicates whether the system has received registration information regarding association of a physical instance of the corresponding optical code with one of the objects.

16. The method of claim 15, wherein the data regarding the event types comprises a predefined list of events.

17. The method of claim 15, wherein the data regarding the event types designates an event as a final event.

18. The method of claim 15, wherein the first user input comprises a selection by the user of a data profile, wherein the data profile indicates the event types associated with the objects to be monitored.

19. The method of claim 15, wherein:
the dynamic visual representation indicates that the system has received registration information for a first one of the images by not displaying a first corresponding optical code as a part of the first image; and
the dynamic visual representation indicates that the system has not received registration information for a second one of the images by displaying a second corresponding optical code as a part of the second image.

20. A data collection system, the system comprising a display, one or more processors, and memory storing instructions executable by the one or more processors to cause the system to:
detect a first user input, wherein the first user input comprises an instruction to generate a set of database entries for monitoring respective objects, and wherein the first user input indicates a set of event types associated with the objects to be monitored;
in response to detecting the first user input:
create a set of database entries, wherein each entry of the set of database entries is configured to store data regarding the event types associated with the respective objects; and
generate a set of optical codes, wherein each code of the set of optical codes uniquely corresponds to one of the database entries created;
detect a second user input, wherein the second user input comprises an instruction to display a plurality of images associated respectively with a subset of the set of database entries, wherein each image of the plurality of images uniquely corresponds to a respective one of the set of database entries; and in response to detecting the second user input, display a dynamic visual representation of the plurality of images, wherein, for each of the plurality of images, the image visually indicates whether the system has received registration information regarding association of a physical instance of the corresponding optical code with one of the objects.

21. A non-transitory computer-readable storage medium storing instructions for configuring a data collection system, the instructions configured to be executed by one or more processors of a system comprising a display and one or more processors, the instructions configured to cause the system to:
detect a first user input, wherein the first user input comprises an instruction to generate a set of database entries for monitoring respective objects, and wherein the first user input indicates a set of event types associated with the objects to be monitored;
in response to detecting the first user input:
create a set of database entries, wherein each entry of the set of database entries is configured to store data regarding the event types associated with the respective objects; and
generate a set of optical codes, wherein each code of the set of optical codes uniquely corresponds to one of the database entries created;
detect a second user input, wherein the second user input comprises an instruction to display a plurality of images associated respectively with a subset of the set of database entries, wherein each image of the plurality of images uniquely corresponds to a respective one of the set of database entries; and
in response to detecting the second user input, display a dynamic visual representation of the plurality of images, wherein, for each of the plurality of images, the image visually indicates whether the system has received registration information regarding association of a physical instance of the corresponding optical code with one of the objects.

22. A data measurement and collection system, comprising:
a server configured to:
detect a first user input, wherein the first user input comprises an instruction to generate a set of database entries for monitoring respective objects, and wherein the first user input indicates a set of event types associated with the objects to be monitored;
in response to detecting the first user input:
create a set of database entries, wherein each entry of the set of database entries is configured to store data regarding the event types associated with the respective objects; and
generate a set of optical codes, wherein each code of the set of optical codes uniquely corresponds to one of the database entries created; and
a mobile electronic device comprising an optical sensor and a GPS sensor, the mobile electronic device configured to:
detect, by the optical sensor, one of the optical codes of the set of optical codes, wherein the optical code is physically associated with one of the objects; and
in response to detecting the optical code:
transmit geographic information from the GPS sensor to the server; and
transmit event information associated with the object, the event information being distinct from the geographic information, to the server.

23. The system of claim 22, wherein the mobile electronic device is configured to, in response to detecting the optical code, display a graphical user interface configured to accept a user input indicating the event information associated with the object.

\* \* \* \* \*